United States Patent [19]

Eshghy

[11] 4,280,380
[45] Jul. 28, 1981

[54] TENSION CONTROL OF FASTENERS

[75] Inventor: Siavash Eshghy, Pittsburgh, Pa.

[73] Assignee: Rockwell International Corporation, Pittsburgh, Pa.

[21] Appl. No.: 31,364

[22] Filed: Apr. 19, 1979

Related U.S. Application Data

[60] Division of Ser. No. 912,151, Jun. 2, 1978, Pat. No. 4,179,786, which is a continuation-in-part of Ser. No. 712,554, Aug. 9, 1976, abandoned, and Ser. No. 766,429, Feb. 7, 1977, Pat. No. 4,106,570.

[51] Int. Cl.³ .................. B23P 19/06; B25B 23/14; F16B 31/02
[52] U.S. Cl. .................. 81/470; 73/761; 173/12; 29/240; 29/407
[58] Field of Search .......... 29/240, 407; 73/139, 73/761; 81/52.4 R, 52.4 B, 52.5; 173/1, 12

[56] References Cited

U.S. PATENT DOCUMENTS

| 3,965,778 | 6/1976 | Aspers et al. | 81/407 |
| 4,000,782 | 1/1977 | Finkelston | 173/12 |
| 4,023,406 | 5/1977 | Benz | 73/139 |
| 4,104,778 | 8/1978 | Vliet | 29/407 |
| 4,104,779 | 8/1978 | Sigmund | 29/407 |
| 4,104,780 | 8/1978 | Sigmund | 29/407 |
| 4,106,176 | 8/1978 | Rice et al. | 29/407 |

*Primary Examiner*—Ervin M. Combs

[57] ABSTRACT

There is disclosed a technique for tightening threaded fasteners in which values of offset torque, initial tension rate relative to angle, final tension rate relative to angle and other joint related factors are empirically determined by instrumenting a plurality of fasteners of the type ultimately to be tightened. In one embodiment, torque and angle are monitored during tightening. Calculations are conducted, while tightening, to determine the tension prevailing in the bolt at a particular angle of advance. By using the calculated tension value and the particular angle of advance, an instantaneous position of threading advance on the tension-angle curve of the fastener is established. From this instantaneous position, it is determined how much greater angle of advance or how much torque is required to tighten the fasteners to a final desired tension value. The same technique may also be used merely to monitor tightening which is terminated by a different tightening strategy. A number of quality control procedures are conducted to determine if the fastener and the tightening tool are performing normally. In another embodiment, analog devices are utilized to convert sensed values of torque and the rate of threading advance into parameters which control tool shut off.

9 Claims, 16 Drawing Figures

TENSION CONTROL OF FASTENERS

This is a division of application Ser. No. 912,151, filed June 2, 1978, now U.S. Pat. No. 4,179,786, which was a continuation-in-part of application Ser. No. 712,554, filed Aug. 9, 1976, now abandoned, and of application Ser. No. 766,429, filed Feb. 7, 1977, now U.S. Pat. No. 4,106,570.

This invention relates to a technique for tightening threaded fasteners. The function of threaded fasteners is, of course, to unite two or more pieces into a typically rigid part called a joint. For purposes of convenience, the term fastener pair may be used to designate male and female threaded members, e.g. a nut and bolt, bolt and internally threaded hole of a joint part, threaded stud and nut, and the like. The connected pieces of a joint should be so tightened as to remain in contact during vibration, static and/or dynamic loading of the part, and the like. In many applications where several threaded fasteners are used, it may be of substantial importance to assure that the contact pressure between the pieces created by the fasteners is uniform since non-uniform deflection of the pieces may create unacceptable joint conditions. Proper assembly should produce uniform contact pressures from joint to joint in accordance with design requirements. This can be achieved only by assembly procedures that produce uniform joint preload or clamping load. Although it is conceivable to determine joint preload or clamping load in terms of compression of a nut, it is more practical to deal in terms of bolt tension. There is, unfortunately, no direct technique for measuring bolt load externally without instrumenting the bolt or using a load washer which is either impractical or uneconomic for assembly line production. Accordingly, all practical techniques of bolt tension control in production quantities are inferential.

There are a number of well known techniques for tightening threaded fasteners based on information available from external instruments such as torque and angles sensors as contrasted to specially designed fasteners or load washers. Included in these techniques are torque control, turn-of-the-nut method, the yield point method, acoustic measuring, overrunning schemes and torque rate methods.

One of the present techniques in wide use is torque control in which a constant final torque is applied to all fasteners. Final torque is typically produced by a stall air tool and the degree of torque control depends on the uniformity of air pressure, motor performance and the hardness of the joint. The intention is to achieve tension scatters in the range of ±10–20% about the mean. The actual scatter limits can be verified by instrumenting the bolts in a laboratory environment. Opinions vary on what tension scatters are actually present in large quantities of fasteners tightening with torque control methods. It would not be surprising to learn that total tension scatter in production quantities is on the order of ±100% of mean which can be caused by a ±41% scatter in friction alone.

Torque is, of course, related to tension but the relationship is subject to large uncertainties resulting from a first order dependence on thread and head friction. In the simplest theoretical consideration, the following equation describes the relation of torque and tension:

$$T = (f_h r_h + f_{th} r_{th}) F \quad (1)$$

where T is torque, $f_h$ is the coefficient of friction between the fastener head and the abutting piece, $r_h$ is the effective radius of head friction, $f_{th}$ is the coefficient of friction between the threads of the fastener, $r_{th}$ is the effective radius of thread friction and F is bolt tension. Although the mean value of the coefficients of friction can be substantially reduced by lubricants and coatings, the relative scatter about the mean value cannot be substantially affected. Combining the friction uncertainties with the variations in applied torque, the tension control actually achieved in practice is quite poor. Accordingly, in order to minimize fastener failure during assembly, the mean torque must be designed at unreasonably low levels as compared with the strength of the bolt. Even with unreasonably low mean torque values, a significant proportion of the fasteners are woefully understressed while many have been stressed past the elastic limit.

Discussions of torque control methods of tightening threaded fasteners are found in Assembly Engineering, October 1966, pages 24–29; Hydrocarbon Processing, January 1973, pages 89–91; Machine Design, Mar. 6, 1975, pages 78–82; The Engineer, London, May 26, 1967, pages 770–71; Iron Age, Feb. 24, 1966, page 66; Machine Design, Feb. 13, 1964, pages 180–85; Power Engineering, October 1963, page 58; and U.S. Pat. Nos. 3,555,938 and 3,851,386.

Another widely used technique for tightening threaded fasteners in production quantities is called the turn-of-the-nut method which makes use of the applied torque as well as the angle of threading advance. In its simplest form, the technique is to advance the fasteners until a predetermined torque value is reached, for example snug torque, and then turn each nut an additional constant predetermined angle. The concept is that the relation of the turn of the fastener to the strain of the bolt will eliminate the influence of friction on the final desired tension value. If the clamped pieces were purely elastic and contact between them were immediate and perfect, one would expect the bolt tension to increase linearly with unit angle of advance starting with the value of zero at the onset of contact. In theory, tension control would be as accurate as the uniformity of the joint tension rate which is the slope of the curve obtained by plotting tension against angle of advance.

In practice, the tension rate is not exactly a constant from joint to joint nor is it uniform as a function of angle for any single joint. The reasons are related to microplasticity which is the yield of surface irregularities in the moving fastener components, lubricant squeeze film and the fact that contact is gradual rather than immediate. The turn-of-the-nut method is customarily considered to be substantially superior to the torque control technique although data developed during the investigation of this invention suggests that this method is substantially overrated, at least at low to moderate tension values. The turn-of-the-nut method does have the disadvantage of partly relying on torque which is subject to the large uncertainties previously discussed. The selection of the threshold torque is a critical decision. If threshold torque is too high, the theoretical advance over the torque control method is substantially reduced. If threshold torque is too low, final bolt tension will fluctuate greatly from joint to joint, since at low torque values, both the torque-angle and the tension angle curves have varying curvature. The combination of uncertain tension at the threshold torque and nonuniformity of tension rate in a large angle span will more than offset the theoretical advantage gained. The turn-of-the-nut method, being essentially a strain approach to tightening, has the advantage of reducing substantially the rate of bolt failure during assembly because very large strains can be sustained by the bolt material in the plastic zone. During the investigation of this invention it has been learned that the difference between low torque rate fasteners and high torque rate fasteners from the same sample can develop a scatter in the final desired tension value of ±50% at tension values in the range of 3000 pounds for a 5/16"-24, grade 8 bolt using the turn-of-the-nut method. As the final tension value increases, the scatter reduces as a percentage of final tension.

Another difficulty with turn-of-the-nut methods is that recalibration is required when the final desired tension value is changed. This is in contrast to this invention where the final desired tension value can be changed at will so long as this value is in the second tension rate range and is sufficiently far from the break in the tension curve so that the tool will not run past the desired value because of tool overrun.

Discussion of turn-of-the-nut methods of tightening threaded fasteners are found in Hydrocarbon Processing, January 1973, pages 89–91; Machine Design, Mar. 6, 1975, pages 78–82; Journal of the Structural Division, Proceedings of the American Society of Civil Engineers, April 1966, pages 20–40; Machine Design, Feb. 13, 1964, pages 180–85; and U.S. Pat. No. 3,851,386.

As pointed out in some detail in U.S. Pat. Nos. 3,643,501; 3,963,726; 3,965,778; 3,973,434; 3,974,883; 3,982,419; 4,000,782; and 4,008,772; and Design Engineering (London), January 1975, pages 21–23, 25, 27, 29, another approach for tightening threaded fasteners is known as the yield point method. In this approach, an attempt is made during tightening to sense the onset of plastic elongation of the bolt and terminate tightening in response thereto. The yield point, which is the boundary between the elastic and plastic deformation zones of a metal in a uniaxial state of stress, is quite difficult to determine precisely. Accordingly, the yield point is often defined in terms of an offset strain, typically 0.1–0.2%, which is arbitrarily chosen.

It is apparent that a joint is made up of the clamped pieces as well as the fasteners. The design is usually such that yielding occurs in the bolt shank although it could conceivably occur in the bolt head or nut. The bolt is also subject to shear as a result of torsion created by the turning moment or torque. Accordingly, a bolt is in a combined state of stress. Thus, at high torque values, the stress in the bolt is due to both torque and tension and can substantially alter the tensile strength of a particular specimen. Additional errors may be introduced when the goal is bolt tension control due to natural scatters in the material yield point. Other errors involved in yield point methods are the result of noise in the torque signal and other uncertainties in consistently sensing the yield point. The main objection to the yield point method is the concern over the fatigue strength and reusability of the bolt. Although the matter is subject to some controversy, it appears clear that one time application and release of an external load will cause relaxation of the joint and accordingly reduce the clamping force applied by the bolt below the original clamping force. In extreme cases, the bolt may lose all tension and be loose.

Other techniques related to yield point methods are found in U.S. Pat. Nos. 3,939,920 and 3,974,685. In the former, the technique basically is to measure a tightening parameter, e.g. torque, at the yield point, conduct certain calculations and back off the nut until the final desired axial stress is achieved and terminate tightening. In the latter, the technique is to provide a washer which yields at a known stress value below the yield point of the bolt. When the washer yields, a torque value is obtained and noted at a known value. Extrapolations are made to obtain a calculated torque value at a desired elevated stress value in the bolt. Tightening is terminated in response to the calculated torque value.

An overrunning approach which may be used to detect galled threads or cross threaded members is disclosed in U.S. Pat. Nos. 3,368,396 and 3,745,820. In this technique, a warning signal is generated when a predetermined torque is developed before a given number of turns has been effected which may be indicative of galled threads. A different warning signal is generated when a larger number of turns are effected before the development of a desired higher torque is obtained which is suggestive of cross threading. It will be apparent that these approaches are not designed to control bolt tension.

Another approach for controlling bolt tension involves acoustic devices which attempt to measure the elongation in a bolt caused by tension. Such devices are discussed and illustrated in U.S. Pat. Nos. 3,306,100; 3,307,393; 3,650,016; 3,759,090 and 3,822,587.

Another group of prior art techniques which has been suggested involve a consideration of the rate of torque increase relative to the angle of threading advance as disclosed in Assembly Engineering, September 1974, pages 42–45; Design Engineering (London), January 1975, pages 21–23, 25, 27, 29; Iron Age, Apr. 28, 1975, page 44; and Machine Design, Volume 47, Jan. 23, 1975, page 44. These techniques monitor the torque-angle curve during tightening in order to terminate tightening in response to conclusions derived from the torque-angle relationship. In the Design Engineering disclosure, tightening is terminated upon sensing a significant drop in the torque rate, which occurs at the yield point. In the remaining articles, tightening is apparently terminated when a predetermined torque range is attained within a fairly narrow angle range. These disclosures are thus similar to the overrunning schemes mentioned above.

The goal of inferential tightening techniques is not merely to achieve a predetermined clamping load on one set of fasteners, since this can be readily done in the laboratory by instrumenting the bolt. The goal is to achieve consistent and reproducible clamping loads or final tension values in large lots of fasteners at a low cost per fastener. Thus, the major fallacy in prior art inferential tightening techniques has been to select a fixed tightening parameter, such as torque or angle in the torque control and turn-of-the-nut methods respectively, or a fixed range of a particular tightening parameter and terminate tightening in response to the attainment of the fixed tightening parameter or range thereof. This broad approach of the prior art has several major difficulties. First, the critical item in tightening is clamping load as may be measured by final bolt tension. With the possible exception of some of the acoustic methods, no one has apparently heretofore been able to inferentially determine final bolt tension in production operations. Second, because of the selection of some parameter other than tension, there is introduced such widely variable factors as friction coefficients, speed related losses, and the like which grossly affect the relationship between the fixed tightening parameter or the fixed range thereof and the only important result in tightening, which is clamping load or bolt tension.

In one aspect, this invention contemplates the determination, during tightening, of the value of a tightening parameter which is sufficient to tighten each fastener pair to a final desired tension value, which parameter varies from one fastener pair to the next. Tightening of the fastener pair is then terminated in response to the variable value of the determined tightening parameter. By this approach, the variation in friction from one fastener pair to the next is largely eliminated. The technique of this invention produces typical tension scatters on the order of less than ±10% in production quantities whereas scatters with turn-of-the-nut techniques are at least 2–3 times higher and scatter with torque control techniques are at least 5–6 times higher. It is accordingly apparent that this invention produces substantially more consistent tightening results than do the significantly inaccurate techniques of the prior art.

In another aspect, an important part of this invention constitutes the quality control procedures that are conducted as a consequence of the acquisition of torque and angle data of each fastener tightened. Most of the quality control procedures are done well prior to the termination of tightening and include procedures for determining whether the prevailing torque of the fastener is too high, determining whether the torque rate of the fastener is linear or arcuate, determining whether the torque rate of the fastener is too low, determining whether the tool is performing normally and determining whether the fastener has exhibited significant non-linear strain. Any of the fastener related quality control checks are used to prematurely terminate tightening in the event indications are that the fastener or its mating engagement with the clamped pieces is defective. The tool related quality control checks provide a warning so that maintenance attention can be given to the tool.

It is accordingly an object of this invention to provide a technique for tightening threaded fasteners which produces substantially more consistent results than the prior art.

Another object of the invention is to provide a tightening technique which provides sufficient data to conduct a number of quality control procedures during tightening.

Another object of this invention is to provide an improved technique for tightening threaded fasteners incorporating monitoring the torque-angle curve, calculating the tension in the fastener being tightened and instructing a tool to tighten the fasteners to a final desired tension value.

Another object of this invention is to provide an improved technique for tightening threaded fasteners incorporating the monitoring of the torque-angle relationship, calculating during tightening the tension appearing in the fastener being tightened and instructing the wrench to continue tightening until a predetermined value of torque or angle is obtained which corresponds to the final desired tension value.

Other aspects, objects and advantages of this invention will become apparent as the description proceeds.

IN THE DRAWINGS

Figure 1:
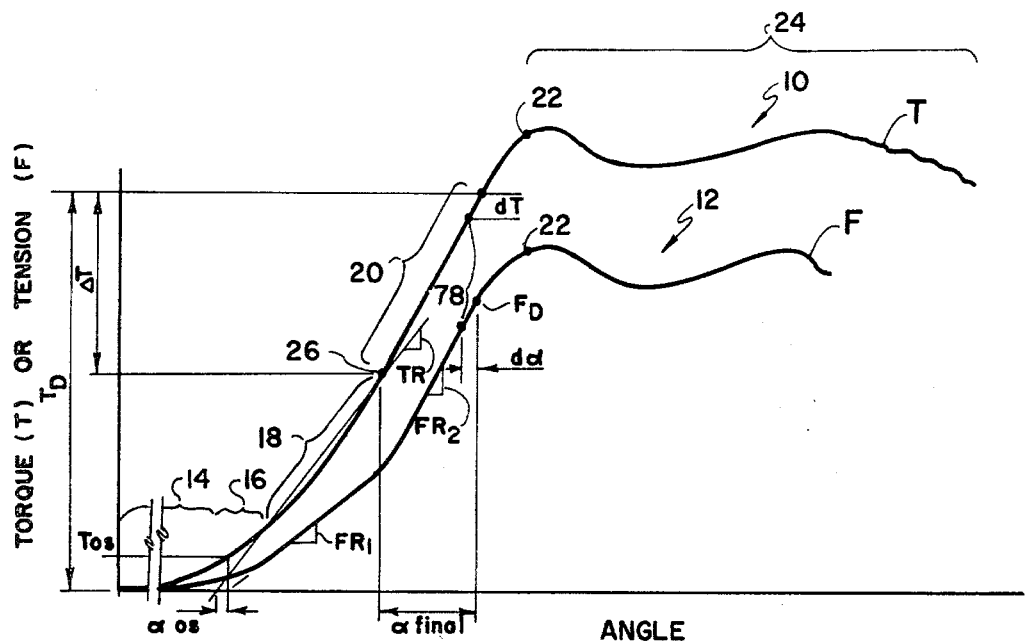
FIG. 1 is an illustration of typical torque-angle and tension-angle curves generated during the continuous tightening of a fastener pair far beyond the elastic limit.

Referring to FIG. 1, there is illustrated a typical torque-angle curve 10 and its corresponding tension-angle curve 12 which are developed during the continuous threading of a fastener pair to a point far beyond the elastic limit of the bolt, as may be measured in the laboratory by suitable equipment. In the torque curve 10, there is typically a free running region or period 14 where only a small torque is required to advance the nut and no appreciable bolt tension exists. This is followed by a region or period 16 of incipient clamp up where the joint parts are being brought toward engagement. This is followed by an engagement period or region 18 where the contact between the surfaces of the fastener and the clamped pieces are being established while the rate of angle advance is gradually being reduced in accordance with the torque-speed characteristics of the tool employed. The tension rate $FR_1$ in the region 18 is typically less than the ultimate tension rate $FR_2$ but is rather well defined. The engagement period 18 appears to cover an approximate tension range of about ten percent to about fifty percent of the elastic limit of the bolt. Above the engagement region 18 is a final tensioning region or period 20 which normally exhibits an increased tension rate $FR_2$. Fortunately, $FR_1$, $FR_2$ and the location of the bend therebetween are normally well defined and reproducible properties of the joint and are not related to friction or other variable factors which may develop in the course of tightening.

The torque rate is essentially zero in the free running region 14 and begins to rise substantially during the incipient clamp up period 16. The torque rate TR in the engagement period 18 approaches linearity. Due to the existance of speed-dependent losses such as lubricant squeeze film and microplasticity of the surface irregularities between the fastener parts and clamped pieces, a linear approximation of the torque curve 10 in the region 18 does not intersect the angle axis at the point of origin of the tension curve 12. An offset angle $\alpha_{os}$ exists which is proportional to such speed dependent losses. $\alpha_{os}$ describes the angular separation between the origin of the average torque slope TR and the origin of the average tension slope $FR_1$. Because of the torque-speed curve of the tool employed, it can be shown that $\alpha_{os}$ is torque rate dependent so that the offset torque $T_{os}$ is the appropriate joint property and $T_{os}$ is the product of the offset angle $\alpha_{os}$ and the torque rate TR.

The elastic limit 22 occurs at a point beyond which strain is not recoverable upon unloading and appears toward the upper end of the final tightening region 20 as is well known in classical mechanics. Somewhere in the yield region 24, the bolt commences to deform plastically rather than elastically. As alluded to previously, the normal definition of the yield point is in range of 0.1–0.2% strain which is somewhat arbitrary. The proportional limit occurs substantially below the yield point 22 and occurs where the stress/strain ratio is no longer constant.

In order to implement the hereinafter disclosed method of tension control, one needs to determine $FR_1$, $FR_2$, $T_{os}$ and other parameters as discussed more fully hereinafter. This is conveniently accomplished by selecting a reasonably large sample of the fasteners that ultimately will be tightened by the technique of this invention and empirically determining the values in the laboratory. It will normally be experienced that scatters in $FR_1$ and either $FR_2$ or r, the ratio of $FR_2/FR_1$, will be quite small. In new bolts, $FR_2$ is normally 5–15% higher than $FR_1$. In fasteners that have previously been tightened, $FR_2$ is normally quite close to $FR_1$. The conclusion is that the difference between $FR_1$ and $FR_2$ is related to the microplasticity of surface irregularities between the mating faces of the joint. As is true is all torque measurements, $T_{os}$ will have much larger scatters. Fortunately, the offset torque correction is normally quite small so that its lack of consistency has a quite minimal effect of the final tension values. One exception is in the use of so-called "prevailing torque" fasteners which usually comprise a bolt or nut having the threads intentionally deformed for various reasons. Another exception involves the use of a bolt or nut in which the threads are unintentionally deformed. In such situations, the normal value of $T_{os}$ should be increased by the addition of the measured "free running" or prevailing torque or this effect compensated for as more fully explained hereinafter.

Broadly, the technique of this invention is to periodically or continuously sense the torque applied to the fastener pair and the angle of advance corresponding to the sensed torque, determine the tension appearing at least at one point 26, calculate a value of tightening parameter sufficient to achieve a final desired tension value $F_D$ and instruct a tool to advance the fastener pair until the attainment of the tightening parameter.

During a study of torque-tension-angle relationships, it was discovered that the inverse of the rate with respect to angle of the logarithm of torque is theoretically a measure of bolt tension irrespective of joint friction. Defining, $$P \equiv [d/(d\alpha)] \log T \quad (2)$$

$$F \propto (1/P), \quad \alpha > \alpha_q \quad (3)$$

where $\alpha_q$ is the angle where P achieves a maximum value and conceivably could be used as the origin for the turn-of-the-nut method thereby totally eliminating the influence of joint friction. In practice, it is difficult to detect a single meaningful peak which can be labeled $\alpha_q$ because of the noise inherent in the actual torque-angle signal. Although the concept expressed in equation (2) is valid, it requires a different procedure for processing the torque-angle data to achieve a practical solution. As will be apparent to those skilled in the art, the solution may be analog or digital. The theoretical basis for equation (2) can be derived from equation (1). Differentiating equation (1) relative to angle, $$\frac{dT}{d\alpha} = (f_h r_h + f_{th} r_{th}) \frac{dF}{d\alpha}. \quad (4)$$

Dividing equation (4) by equation (1), $$\frac{dT/d\alpha}{T} = \frac{dF/d\alpha}{F}. \quad (5)$$

Since $dT/T$ is the definition of $d \log T$, $$\frac{dF/d\alpha}{F} = \frac{d}{d\alpha} \log T. \quad (6)$$

If $dF/d\alpha$, the joint tension rate, is a constant, then:

$$F = \left(\frac{dF}{d\alpha}\right) \left(\frac{d}{d\alpha} \log T\right)^{-1} = FR/P. \quad (7)$$

Equation (7) shows that the constant of proportionality in equation (3) is the tension rate FR.

Several assumptions have been made in the above derivation:

(1) The tension rate is a constant. This is not precisely true throughout the tightening range. The more precise assumption would have been that tension at any angle of advance after the angle of origin, where the tension rate commences, is a unique function of the joint and therefore that the tension rate at any angle after the angle of origin is a unique function of the joint.

(2) Torque is not a function of the turning speed. This is not strictly true and for accurate application, it should be accounted for.

(3) Joint friction $(f_h, f_{th})$ is not load dependent for any one sample. This is a good assumption except when non-metallic (molybdenum disulfide, Teflon, etc.) coatings are utilized. Even in the case of non-metallic coatings, any changes in a finite tension range should be small.

For purposes of convenience, the tightening technique of this invention may be referred to as the logarithmic rate method.

The importance of equations (5) and (7) should now be appreciated. It has been demonstrated in the laboratory that the value of tension rate $dF/d\alpha$ is a function of the joint having small scatter and is independent of friction. The torque rate $dT/d\alpha$ can be determined from torque and angle measurements taken during the tightening of each fastener pair by suitable torque and angle sensors on the tightening tool. The torque value T is, of course, measured by same torque transducer. It will accordingly be apparent that the friction dependent parameters, i.e. torque rate and torque, are determined for each fastener during tightening, which is here defined as the time frame commencing with the onset of threading and stopping at the termination of tightening. Since tension rate $dF/d\alpha$ is a function of the joint which is determined empirically prior to the tightening of production fasteners, it is a simple matter to solve equation (5) for tension.

While theoretically correct, several adjustments should be made to equations (5) or (7) in order to enhance accuracy and reliability. First, the effect of prevailing torque $T_{pv}$ should be taken into account. Prevailing torque is that torque necessary to overcome the thread-to-thread resistance to fastener advance which does not contribute to the inducement of bolt tension and which may be sensed during the threading advance of the fasteners in the region 14. Second, the effect of offset torque $T_{os}$ should likewise be taken into account. Offset torque is that torque necessary, at zero prevailing torque, to advance the fastener to an angle location corresponding to the origin of tension. These accomodations may be expressed mathematically as:

$$F \propto \left\{ \frac{d}{d\alpha_{smooth \atop sense}} [\log (T - T_{os} - T_{pv})] \right\}^{-1} \quad \text{or} \quad (8)$$

$$\frac{dT/d\alpha}{T - T_{os} - T_{pv}} = \frac{dF/d\alpha}{F} . \quad (9)$$

The importance of equations (8) and (9) should now be appreciated.

Referring to FIG. 1, it may be assumed that the fasteners are threaded together with measurements being taken of both torque and angle with tightening being advanced to the point 26. The average torque rate TR is calculated, as by the use of the least squares method. Since the tension rate $FR_1$ is known from empirical measurements of the joint in question, the tension in the joint can be calculated at the point 26 from equation (5) or (9). Graphically, the angle required to advance the fasteners from the tension value calculated at the point 26 to the final desired tension value $F_D$ can be easily done since the tension rate $FR_2$ has likewise been determined empirically. After determining the additional angle $\alpha_{final}$, the tool may be instructed to so advance the fasteners thereby attaining the desired final tension value $F_D$. In a similar fashion, the additional torque $\Delta T$ or the final desired torque $T_D$ can be calculated.

There are substantial difficulties in applying these principles to production line operations. It will be apparent that the calculations being made are being done while tightening. It will be apparent that the duration of tightening should be minimized so far as practicable commensurate with the attainment of consistent results. In any event, it will be apparent that long tightening times, for example two minutes, would render the technique unsuitable for many production line operations although some suitability may remain for special purpose applications such as in the fabrication of reactor vessels, aircraft and the like where precision is paramount. It is accordingly evident that the use of electronic computation techniques is highly desirable for processing the data obtained from measurements taken during tightening. Even with the use of electronic computation techniques, it is desirable to advance the fasteners for some initial distance, suspend tightening momentarily and then resume tightening to the final desired tension value. The momentary stop allows time to complete lengthly calculations and has the additional benefit of allowing the joint to relax at this point rather than at the final tension value attained. As will be more fully apparent hereinafter, many of the calculations are being done while the tool is running as well as when the tool is momentarily stopped. It will, however, be evident that simplified computations may be utilized thereby eliminating the necessity for a momentary pause in the tightening operation.

More specifically, the following steps may be taken to attain a consistent bolt tension utilizing an instructable tool equipped to measure torque and angle information only, after the acquisition of certain empirical information:

1. Engage the fasteners, start the tool and record torque at predetermined angle increments.
2. Shut the tool off in a tension range of 0.4–0.75 of elastic limit. Although a turn-of-the-nut approach or torque control strategy may be used to estimate the initial tool shut off, a simplified logarithmic rate method in accordance with this invention provides more consistent results.
3. Calculate the torque rate from the torque and angle measurements by a suitable smoothing technique, e.g. least squares. Calculate the torque at the midpoint of the range from which the torque rate was calculated, by averaging the torque value along this range. The intersection of the average torque rate with the axis represented by $(T_{pv}+T_{os})$ is accordingly established. Since the offset torque $T_{os}$ is largely a function of the joint, the intersection of the tension curve with the angle axis is established.
4. The tension curve is then a straight line emerging from the origin or intersection determined in 3. above with the initial slope $FR_1$. This is typically valid up to about 0.5 elastic limit at which point the tension curve has a slope of $FR_2$. The location of the bend in the tension-angle curve is determined empirically when determining the values of $FR_1$, $FR_2$ and $T_{os}$.
5. Calculate the tension value appearing in the fasteners at some location, for example, point 26. Given the tension value at point 26, calculate the additional angle $\alpha_{final}$ or the additional torque $\Delta T$ necessary to tighten the fasteners to the final desired tension value $F_D$.
6. Instruct the tool to resume tightening and advance the fasteners through the angle $\alpha_{final}$ or for the increased torque $\Delta T$.

As disclosed in applicant's copending application Ser. No. 766,429, now U.S. Pat. No. 4,106,570 the disclosure of which is incorporated herein by reference, the angle of advance measured by an angle encoder is not the true angle through which the fastener turns because of torsional twist in the tightening tool and because of torsional twist in the bolt. To achieve maximum accuracy, it is necessary to compensate the measured angle of advance for the torsional twist of the tool and bolt. In addition, it is necessary to take into account the torsional twist of the laboratory equipment utilized to acquire values for the tension rates $FR_1$ and $FR_2$.

For purposes of discussion, the implementation of the technique of this invention may be broken down into six generally chronological segments: (1) quality control procedures in the regions 14, 16; (2) reaching the midpoint stop and conducting torque rate determinations and quality control procedures; (3) procedures determining the final shut off parameters; (4) procedures involving restarting the tool; (5) procedures determining the occurrence of non-linear strain during tightening toward the final shut off point; and (6) quality control procedures conducted at the termination of tightening.

QUALITY CONTROL PROCEDURES IN THE REGIONS 14, 16

It has been learned that considerable information can be acquired about the quality of the fasteners during the free running region 14. Specifically, deductions can be made about cross threading, grossly imperfect threads, bolt bottoming, and whether the bolt is already tight. Because the joint has not clamped up, it is evident that the information so acquired concerns the fasteners only and is not affected by other joint properties. It has also been learned that deductions can be made during the incipient clamp up region 16 concerning the tool. Specifically, it can be determined whether the tool has engaged the fastener, whether a fastener is in place, the bolt is broken, one of the threaded members has no threads, or one of the threaded fasteners is the wrong size.

Prevailing Torque

Although the region 14 is referred to as the "free running" region, a small amount of torque is necessary to advance the fasteners because of friction between the mating threads. Some types of fasteners, known as prevailing torque fasteners, include intentionally imperfect threads which require more than a minimum amount of torque in order to threadably advance. Other fasteners which are unintentionally imperfect also require more than a minimum torque to effect threadable advance. For all practical purposes these types of fasteners may be treated identically with one caveat. Any batch of fasteners which are not intended to be prevailing torque fasteners will include some fasteners which have substantially perfect threads thereby requiring only a minimum torque and will also include some fasteners having imperfect threads which require more than a minimum torque for threadable advance. Thus, any technique which is intended to be universal or which is intended to be used with non-prevailing torque fasteners must have the capability of accomodating fasteners which vary from substantially perfect to grossly imperfect.

Broadly, one goal of this procedure is to detect, during tightening in the free running region 14, those fasteners which exhibit instantaneous prevailing torque values $T_{pvi}$ which exceed a maximum expected prevailing torque $(T_{pv})_{max}$. The value of $(T_{pv})_{max}$ may be acquired in any suitable manner, as by relying on the published information of fastener manufacturers, by measuring the prevailing torque on a significant number of fasteners, or by adding an incremental percentage, for example 10-20%, to either published information or acquired values. Similarly, it may be desired to detect those fasteners which exhibit instantaneous prevailing torque values $T_{pvi}$ which are less than a minimum prevailing torque $(T_{pv})_{min}$, as when using prevailing torque fasteners and assurance is required that the fasteners are up to specifications.

Another goal of this procedure is to acquire sufficient information to provide a reasonably accurate value for average prevailing torque $T_{pv}$. This may prove to be of value in correcting a final shut off parameter for the effect of prevailing torque.

Several precautions are desirably taken for the measuring of prevailing torque to assure that the data is reliable. First, it is essential that the acquisition of data occur before the commencement of clamp up of the joint parts. Otherwise, the normal torque required to begin tightening up the joint will be confused or erroneously deduced as abnormal prevailing torque. This error in data acquisition is fatal to proper results because applied torque rapidly increases during joint clamp up as is evident from the showing in region 16 of FIG. 1. Second, the acquisition of data should be delayed until the fastener parts are rotating or other steps should be taken to avoid spurious torque readings from the static friction exhibited between the fastener parts at rest or due to the transition from static to dynamic friction effects.

With the criteria outlined above, it is evident that there is considerable leeway in designing a system for acquiring prevailing torque data for a particular application. Because the need in a particular application may be to reject defective parts, to acquire values for average prevailing torque $T_{pv}$, or both, the design selections are subject to change.

Figure 2:
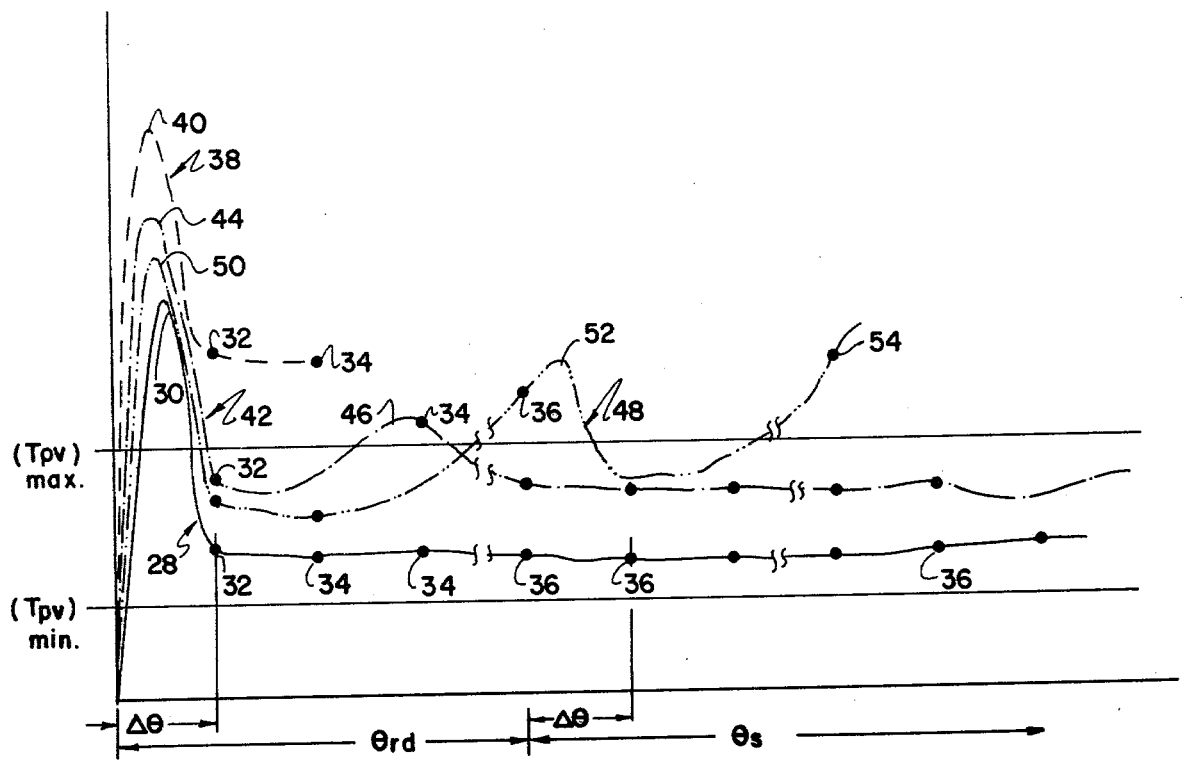
FIG. 2 is an enlarged illustration of the low end of a typical torque-angle curve illustrating very early torque-angle relationships.

In the system disclosed, utilizing the fasteners described immediately preceding Table II, it is desired to take prevailing torque data to reject fasteners at an early stage of tightening and to acquire an average prevailing torque value $T_{pv}$ to compensate the final shut off parameter. Referring to FIG. 2, there is illustrated a typical torque-angle plot 28 of an acceptable fastener exhibiting an initial torque peak 30 caused by static friction between the fastener components and the change over from static to dynamic friction. After the initial torque peak 30, the curve 28 levels out to a reasonably constant value between a minimum expected prevailing torque $(T_{pv})_{min}$ and a maximum expected prevailing torque $(T_{pv})_{max}$. Although the curve 28 is illustrated as a continuously recorded value, in digital systems it is highly desirable to take torque sensings only at selected locations spaced apart by a predetermined angle increment $\Delta\theta$.

In operation, the tool is turned on to commence rotation of the fastener component and a delay of one $\Delta\theta$ angle increment is allowed before a first torque sensing 32 is taken. Thereafter, a torque sensing is taken at every angle increment $\Delta\theta$, indicated by the data points 34, until the expected rundown angle $\theta_{rd}$ is reached. During the expected rundown angle $\theta_{rd}$, the instantaneous torque sensing $T_{pvi}$ at each of the data points 32, 34 is compared with $(T_{pv})_{max}$. If the instantaneous prevailing torque $T_{pvi}$ exceeds $(T_{pv})_{max}$ more than once, a shut off command to the tool is issued, an indication is made that the joint is unacceptable and the system is reset for the next tightening cycle. Although it is normally desirable to have the tool operator intervene following the rejection of a joint and although the typical air powered tools used to tighten fasteners are not reversible, it may be desired in some applications to automatically back off the nut by providing a reversible tool and instructing the tool to back the nut off prior to reset for the next tightening cycle. In connection with the fasteners exhibiting the curve 28, it is apparent that no shut off command is issued.

With the system designed in this manner, decisions need to be made about the size of the angle increments $\Delta\theta$, the size of the rundown angle $\theta_{rd}$, and the size of a sampling region $\theta_s$. The value of $\Delta\theta$ is selected so that the transient effect of the static-to-dynamic peak 30 and any other transient effect will be sensed only once if at all. It has been found that the transient torque effects in the free running region 14 are of quite short angular duration. Although the value of $\Delta\theta$ is susceptible to considerable compromise, a selection of 22° has proved satisfactory. The value of the rundown angle $\theta_{rd}$ is selected to assure that both the rundown angle $\theta_{rd}$ and the period of data acquisition $\theta_s$ immediately following $\theta_{rd}$ are completed substantially before the incipient clamp up region 16 commences. The value of $\theta_{rd}$ accordingly depends on the duration of the sampling period $\theta_s$, the length of the threaded fastener compared to the size of the parts to be clamped up and the like. The selection of $\theta_{rd}$ and $\theta_s$ should be conservative to provide assurance that these angular periods are completed prior to the incipient clamp up region 16. The value of $\theta_{rd}$ may thus vary widely and in one embodiment of the invention is five complete revolutions of the fastener or torque appling tool.

Similarly, the duration of the sampling region $\theta_s$ may also vary widely. It is not essential to take an enormous number of torque readings to establish a reasonably reliable value for average prevailing torque $T_{pv}$ for the following reasons. It will be shortly apparent that the value of $T_{pv}$ is relatively small when compared to the torque readings T from which $T_{pv}$ will be subtracted. Accordingly, any difference between the true average prevailing torque and the calculated value will be smaller still. It is accordingly quite satisfactory to obtain an average value from a fairly modest number of data points, e.g. 5–30. Although the duration of the sampling period $\theta_s$ is susceptible to considerable compromise, a sampling duration on the order of one revolution has proved satisfactory. Since prevailing torque $T_{pv}$ is created by circumferential asymmetry of the nut and bolt, a selection of one revolution for the sampling region $\theta_s$ is a natural one. The sampling interval between the data points 36 in the region $\theta_s$ may conveniently continue to be 22°. Accordingly, approximately sixteen data points 36 are used.

In calculating the average prevailing torque $T_{pv}$ in the sampling region $\theta_s$, there are a number of conceivable approaches. First, one may merely add the values of the torque sensings $T_{pvi}$ and divide by the number of data points. In the alternative, one may elect to use a smoothing technique such as least squares. Furthermore, one could conceivably average the torque sensings after disregarding any value above $(T_{pv})_{max}$ and either arithmetically averaging or smoothing the remaining data. For reasons mentioned previously, any reasonably accurate averaging technique will suffice because the difference between the calculated average and the true average will be a very small value.

It will be seen that by delaying the first data point 32 by the angle increment $\Delta\theta$ from the onset of rotation, the existence of the static-to-dynamic peak 30 will likely be masked. By separating the data points 32, 34, 36 by the angle increment $\Delta\theta$, any transient torque effect will be sensed only once if at all. By delaying the sampling period $\theta_s$ until after the rundown angle $\theta_{rd}$, one is reasonably assured that sampling for averaging purposes avoids any spurious sensings related to the onset of tightening.

As will be more fully pointed out hereinafter, a reasonably reliable value for $T_{pv}$ is desirable to compensate a final shut off parameter for the effect of prevailing torque. In this regard, it will be evident that the amount of torque applied to a fastener during the free running region 14 has nothing whatsoever to do with the attainment of tension in the bolt at the termination of tightening. The compensation made for the tightening strategy of this invention will be discussed more fully hereinafter. In a torque control strategy, however, the running torque sensed by the torque encoder in the final tightening region 18 should be adjusted by the amount of the noted prevailing torque to obtain a torque value which can be compared to the desired torque shut off parameter. For example, if empirical data suggests that the fastener needs to advance 30 ft-lbs above an average prevailing torque of 3 ft-lbs and the fastener being tightened exhibits a prevailing torque of 5 ft-lbs, the tool should be instructed either: (1) to advance the fastener to 35 ft-lbs, or (2) to advance the fastener 30 ft-lbs beyond the noted prevailing torque of 5 ft-lbs, or (3) to advance the fastener until the difference between the sensed torque and the noted prevailing torque equals 30 ft-lbs. In a turn-of-nut strategy, the torque sensings used in reaching the angle location known as snug torque should be similarly adjusted by the amount of the noted prevailing torque.

Also shown in FIG. 2 is a torque-angle curve 38 which clearly indicates an undesirable fastener pair. The curve 38 exhibits a torque peak 40 caused by the change over from static to dynamic friction and then levels out to a running value above $(T_{pv})_{max}$. A preferred technique for determining when a fastener pair is unacceptable is the occurrence of two torque sensings $T_{pvi}$ above $(T_{pv})_{max}$. The torque sensing at the first data point 32 is above $(T_{pv})_{max}$ so that when the second data point 34 is likewise above this value, the tool shuts off, the joint is indicated as being unacceptable and the system is reset for the commencement of a new tightening cycle.

It is evident that any system which rejects fasteners having excessive prevailing torque sensings will reject the fastener pair exhibiting the curve 38 and will pass the fastener pair exhibiting the curve 28. There are, however, a number of fasteners which exhibit a torque-angle curve 42 which is distinctly different than either of the curves 28, 38. The curve 42 includes a static-to-dynamic peak 44 and then levels out initially to a value below $(T_{pv})_{max}$. The curve 42 also exhibits a transient peak 46 which is above $(T_{pv})_{max}$ which is detected at the subsequent data point 34. Thereafter, the curve 42 levels out below $(T_{pv})_{max}$. It is highly desirable not to reject the fasteners exhibiting the curve 42 because the transient torque peak 46 does not repeat or is not sensed more than once. Accordingly, the conclusion is that the transient peak 46 is not indicative of a serious thread imperfection.

A somewhat different situation is evidenced by a torque-angle curve 48 which exhibits a static-to-dynamic peak 50 and at least a pair of subsequent transient torque peaks 52, 54. In this situation, there are at least two instances where data taken at the points 34 indicate that the instantaneous prevailing torque $T_{pvi}$ exceeds $(T_{pv})_{max}$. Although it is within the bounds of judgment to accept fasteners exhibiting several transient peaks, such as illustrated by the curve 48, it is preferred to reject these fasteners.

It will accordingly be seen that there is provided a technique for rejecting threaded fasteners at an early stage of the tightening cycle in response to a torque sensing indicative of serious fastener imperfections.

If fasteners are often rejected because of high $T_{pvi}$ sensings, it may be concluded that the batch of fasteners is suspect. Accordingly, a running average of rejections to fasteners run is conducted. If $$\frac{R_{pv}}{N} \geq E \tag{10}$$

where $R_{pv}$ is the number of fasteners rejected, N is the sample size and E is a fractional value acceptable to the user, such as 0.15, a signal is displayed at the operator's station to indicate a parts defect. The value of N is preferably not the cumulative number of joints tightened but is a running value, as by storing, on a first-in, first-out basis, a finite number of joints tightened, such as 30.

In the event that prevailing torque fasteners are being tightened and it is desired to determine that the fasteners do exhibit prevailing torque, it appears tht the check to be made is to compare average prevailing torque $T_{pv}$ with $(T_{pv})_{min}$. In the event that $T_{pv}$ is less than $(T_{pv})_{min}$, the fasteners should be rejected.

Is Tool Advancing Fastener?

Another quality control procedure conducted early in the tightening cycle is to determine whether the fastener is threadably advancing. This is accomplished by measuring the time elapsed between the instant the tool is turned on until the torque encoder senses a predetermined minimum torque $T_{sth}$ which is the threshold torque stored by the data processor after the preliminary data points 32, 34, 36. To establish $T_{sth}$, a torque value $T_1$ is empirically determined and is the first torque value utilized to calculate a preliminary torque rate as discussed hereinafter. $T_1$ is on the order of about 20-30% of the average final torque value obtained in running the same to empirically determine $FR_1$, $FR_2$ and $T_{os}$. When the storing threshold torque $T_{sth}$ is sensed to be $$T_{sth} = 0.25(T_1 + T_{pv}) \tag{11}$$

the data processor begins to store torque values sensed by the torque encoder. If the data processor does not commence to store torque value within a very short period, on the order of 3-10 seconds, of the onset of tool turn-on, the conclusion is that no bolt is present, the tool socket has not engaged the bolt head, the bolt is broken, one of the threaded members has no threads, or one of the threaded members is the wrong size. In this event, a signal is generated by the data processor to turn off the tool, signal that one of these conditions exists and reset the tool for the next tightening cycle.

REACHING THE MID-POINT STOP, TORQUE RATE PROCEDURES, AND QUALITY CONTROL PROCEDURES

Reaching the Midpoint

Figure 3:
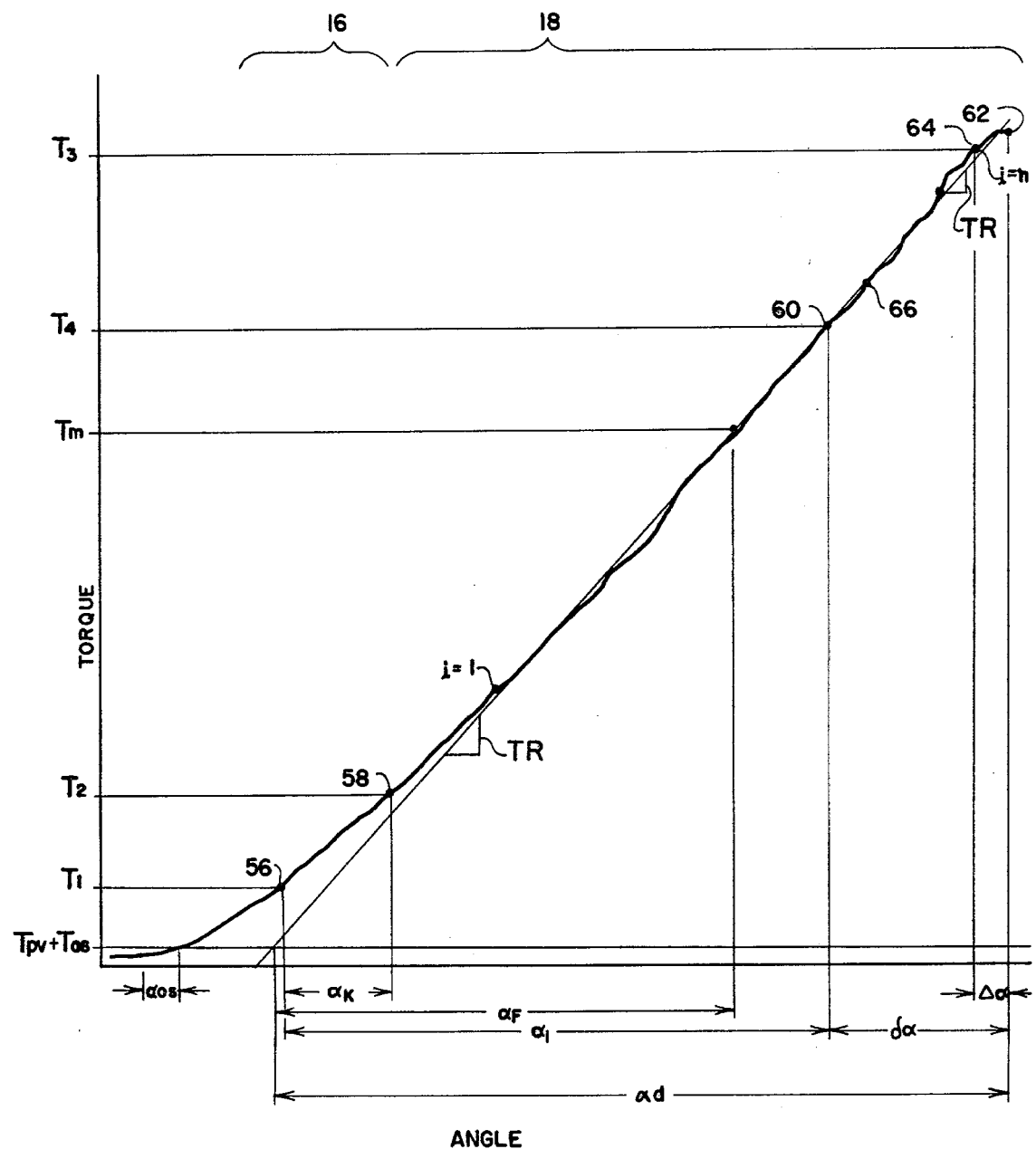
FIG. 3 is an enlarged illustration of a typical torque-angle curve constituting a continuation of FIG. 2.

The intent at the mid-point stop is for the joint to be tightened to an angular location corresponding to the break in the tension-angle curve for reasons more fully pointed out hereinafter. Although a torque control or turn-of-the-nut method can be used to determine the mid-point stop, it is preferred to use a simplied logarithmic rate method in accordance with this invention. Referring to FIG. 3, which is a continuation of the normal torque-angle curve 28 of FIG. 2, the tool continues to turn the fasteners with torque values being recorded and stored at fairly small equal angle increments which may be, for example, in the range of 0.2°–3°.

The angle encoder may conveniently be of the digital type to deliver a pulse at small, equal angle increments. The unit of angle used for calculation purposes is $\Delta\alpha$ which is one or more multiples of the angle pulse. The value for $\Delta\alpha$ depends on the elastic properties of the joint and typically are in the range of 0.5°–6° although a wider range is acceptable in some circumstances. With fasteners of the type studied, a selection in the range of 2°–3° seems preferable. In getting to the mid-point, torque and angle measurements obtained in the region 16 are used.

Referring to FIG. 3, when running torque is first sensed to be equal to or greater than $T_1$, such as at the location 56, the angular position of the location 56 is noted and stored. When the tool passes the point 58 which is one $\alpha_k$ degrees beyond the location 56, the torque value $T_2$ is sensed and stored. The value of $\alpha_k$ is preferably large enough to give a rough approximation for a preliminary torque rate, which is calculated as $(T_2 - T_1)/\alpha_k$. If $\alpha_k$ were very large, the tool would not be stopped until late, leaving little or no additional room to resume tightening. If $\alpha_k$ were very small, the value of torque rate calculated from $(T_2 - T_1)/\alpha_k$ would be so influenced by noise in the torque sensings that it would be unreliable. The actual value of $\alpha_k$ depends on the elastic properties of the joint. A compromise of 9° for $\alpha_k$ has proved acceptable for the particular joint described preceeding Table II although other compromises are obviously acceptable.

The data processor then calculates $\alpha_1$, in accordance with the following equations:

$$\alpha_1 = c + a(T_2 - T_{pv}) \tag{12}$$

$$c = \alpha_d - \alpha_{or}\left(1 - \frac{T_{os}}{T_o}\right) - N_1\frac{T_1 - T_{os}}{K_o} - aT_1 \tag{13}$$

$$a = \frac{1}{\alpha_k}\left[\frac{\alpha_{or}\alpha_d}{T_o} + N_2\frac{T_1 - T_{os}}{K_o^2} - \frac{\alpha_{or}^2}{T_o}\left(1 - \frac{T_{os}}{T_o}\right)\right] \tag{14}$$

$\alpha_d$ is the desired angle from tension origin to mid-point and is $(F_M/FR_1)$ or slightly greater where $F_M$ is the tension value at the junction of the two tension regions indicated by $FR_1$ and $FR_2$, $\alpha_{or}$ is the tool overrun at idle due to actuation delay, $T_o$ is the stall torque of the tool, $K_o$ is a typical torque rate for the particular fasteners involved and is determined empirically, and $N_1$ and $N_2$ are correction factors necessitated by the inaccurate algebraic expansion of more precise equations, which expansion substantially reduces calculation time compared to the exact equations. It will be apparent that, in a production line situation involving the same size bolts and the same size tools, every value in these equations, except $T_2$ and $T_{pv}$ can be reduced to numbers before starting. Thus, the computations are actually easier and quicker than appears.

It might be questioned why the value of $\alpha_k$ is of any importance since neither equation (12), (13) or (14) appears to contain a value for preliminary torque rate. Equations (12), (13) and (14) constitute one application of the logarithmic rate method to achieve a mid-point tension value of $FR_1\alpha_d$ with provisions made for tool overrun due solely to the time delay between the shut off command and exhaustion of air from the tool. The mathematical complexities have, by design, been transferred from equation (12) to equations (13) and (14) so that computation of equation (12) during tightening requires the least possible elapsed time. Equations (13) and (14) can be coupled manually either prior to system installation or computed by the microprocessor when in a dormant portion of the tightening cycle, for example, prior to the initiation of tightening. Although the preliminary torque rate $(T_2-T_1)/\alpha_k$ does not appear in equations (12), (13) or (14) as written, if one were to substitute the equations for a and c into equation (12), one would find that the preliminary torque rate appears. Accordingly, the reasons why $\alpha_k$ should not be too large or too small are as previously discussed.

As will be recognized by those skilled in the art, equations (13) and (14) do not include a tool overrun prediction due solely to the inertia of the rotating parts of the tool. For moderate and high torque rate bolts, the amount of angular overrun due solely to inertia is rather insignificant. The reason, of course, is that the tool is not rotating very fast. With low torque rate bolts, which the tool is able to turn faster, the amount of overrun due solely to inertia is still modest. For applications where maximum accuracy is desirable, equations (13) and/or (14) may be modified to incorporate a measure of overrun prediction based on inertia.

The determination of the mid-point stop is of some importance as may be visualized from an appreciation of FIG. 1. It will be recollected that it is desired to calculate the average torque rate TR. If the mid-point stop occurs, for example, in the lower part of the region 18, the average torque rate will be substantially too low. If the mid-point stop is too late and well into the region 20, two difficulties are presented: (1) the calculated torque rate TR may be substantially too high although some calculations can be done to disregard some of the later data in order to shift the range where torque rate calculations are actually being conducted, and (2) there may be little or no additional room available to resume tightening to the final desired tension value considering allowance for tool overrun.

Referring to FIG. 3, the tool is commanded to shut off at a point 60 which is $\alpha_1$ degrees beyond point 56 which was where the torque value $T_1$ was first equalled or exceeded. Because of the time delay in the tool from the shut off command until the tool actually stops, which is represented by the point 62, the tool has overrun by an angle $\delta\alpha$. The mid-point stop 62 typically falls in the range of about 0.4–0.75 of the elastic limit. For any given application, the empirically determined values act to establish the mid-point stop 62 at a given fraction of the elastic limit which is not changed until new empirical data is developed which, as for example, may occur when a different type fastener is selected.

Torque Rate Procedures

In order to calculate the average torque rate TR, a decision must be made of which torque and angle measurements are to be used. It has been learned that the torque sensings approaching the stopping point 62 are somewhat unreliable because of speed dependent variables. Accordingly, in the computations conducted to determine average torque rate TR, those sensings which are affected by the act of stopping are disregarded. Although more than one torque sensing may be discarded in order to provide greater assurance, it is assumed for purposes of simplicity that only the last torque value is ignored. Accordingly, the highest torque value used in the torque rate calculations is at a location 64 which is one $\Delta\alpha$ backward from the point 62. The torque value at the point 64 is $T_3$. The total number of values used in torque rate calculations, designated n for more general purposes, may vary widely and is subject to considerable compromise. A total of fourteen consecutive data points has proved quite acceptable. The mean torque $T_m$ and the average torque rate TR are then calculated using the following summations where i is a designation for each point selected for the torque rate calculations and $T_i$ is the torque value there sensed;

$$T_m = \frac{1}{n} \sum_{i=1}^{n} T_i \tag{15}$$

$$TR = -6 \sum_{i=1}^{n} [(n + 1 - 2i)T_i]/[n(n - 1)(n + 1)(\Delta\alpha)] \tag{16}$$

Equation (15) will be recognized as merely adding the torque values occurring at each of the points i and dividing this sum by the total number of data points n. Equation (16) will be recognized as a least squares fit for the data points i.

It is desirable to assure that the mean torque $T_m$ and the average torque rate TR are taken over substantially the same tension range during the tightening of each fastener pair. This may be accomplished by checking to determine how close the angular position of the stopping point 62 is to the break in the tension-angle curve 12. The angular position of the mean torque $T_m$ along an abcissa $T_{os}+T_{pv}$ may be calculated from the equation:

$$\alpha_F = \frac{T_m - T_{os} - T_{pv}}{TR} \text{ where } \alpha_F > 0. \tag{17}$$

The angular distance from the point of origin of the tension curve 12 to the stopping point 62 may be calculated from actual data derived from the fastener being tightened from the equation:

$$\alpha_{origin} = -\frac{1}{2}(n + 1)\Delta\alpha - \alpha_F \text{ where } \alpha_{origin} < 0. \tag{18}$$

For calculation purposes, it is desirable that $\alpha_{origin}$ be a negative value. From empirically determined information done prior to the tightening of production fasteners, the start of the second tension region may be calculated from the equation:

$$\alpha_{FM} = \frac{F_M}{FR_1} \text{ where } \alpha_{FM} > 0 \tag{19}$$

where $F_M$ is the tension value at the break. The difference between $\alpha_{origin}$ and $\alpha_{FM}$ may be obtained from the equation:

$$X = -\alpha_{origin} - \alpha_{FM}. \tag{20}$$

It will be remembered that $\alpha_{origin}$ is a negative value.

If $X \geq 0$, this means that the mid-point stop 62 is too late and consequently that the largest torque value $T_3$ in the torque rate calculations is too large. Without revising the value for TR, TR will tend to be too high as previously discussed. Accordingly, one needs to shift the range of torque rate calculations downwardly on the torque-angle curve illustrated in FIG. 3. Thus, $$n_H = \downarrow \left(\frac{X}{\Delta\alpha}\right) + 1; \text{ and} \quad (21)$$

$$n_1 = n. \quad (22)$$

From the stopping point 62, one moves downwardly along the torque-angle curve by $n_H$ angle increments of $\Delta\alpha$ to define a new point 66 as the upper limit of the range through which torque rate will be calculated. The symbol $\downarrow$ means that any fractional value is dropped so that the number used is the next lowest integer from the calculated value. The total number of data points n remains the same.

If $X \leq 0$, this means that the stopping point 62 occurred too soon which would tend to give a value for torque rate that is too low. Since one cannot move upwardly on the torque-angle curve to o tain an additional area of measurement, the practical solution is to accept fewer data points for torque rate calculations thereby, in effect, lopping off the lower end of the range. Accordingly, $$n_{H1} = 1; \text{ and} \quad (23)$$

$$n_1 = \downarrow \left(\frac{F_o - F_L}{\Delta F}\right) + \downarrow \left(\frac{X}{\Delta\alpha}\right) \quad (24)$$

where $n_{H1}$ indicates that the point or location where the largest torque value used in the torque rate calculations occurs. Since the largest torque value will remain the same, $n_{H1} = 1$ so that the torque $T_3$, being $\Delta\alpha$ removed from the stopping point 62, is the largest torque value used. The new value for $n_1$, which is the total number of data points used, is based on the assumption that the tension rate in the first region is substantially linear above a minimum tension value $F_L$, determined empirically, and that the tension $F_o$ in the joint at the stopping point 62 lies in the first tension range. The symbol $\Delta F$ is the additional tension in the first tension rate per angle increment $\Delta\alpha$ and may be expressed mathematically as:

$$\Delta F = FR_1 \Delta\alpha \quad (25)$$

The tension $F_o$ in the joint at the stopping point 62 is $$F_o = -FR_1 \alpha_{origin} \text{ where } X \leq 0, \text{ or} \quad (26)$$

$$F_o = F_M + rFR_1 X \text{ where } X > 0 \quad (27)$$

where $F_M$ is the empirically determined tension value at the break in the tension curve 12 and r is the ratio of $FR_2/FR_1$.

It is conceivable that $n_1$ may be too small, e.g. two or three points, to give good results with the least squares equation (16). Accordingly, a check is made to determine if $n_1$ is less than one half of n. In this event, $$n_2 = \downarrow \left(\frac{F_o - F_L}{\Delta F}\right) \quad (28)$$

and $n_2$ is used as the total number of data points.

Accordingly, a new summation is performed for mean torque $T_m$ and torque rate TR in accordance with equations (15) and (16) utilizing the new starting place in the event that $X \geq 0$ or starting with the same highest torque value but using fewer number of data points in the event that $X < 0$.

With revised values for mean torque $T_m$ and torque rate TR, a revised value may be obtained for the angle of origin of the torque-angle curve using equation (17) and a revised value and for the origin of the tension-angle curve using equation (18). A calculation is again made to determine whether the tool has overshot or undershot the break in the tension curve in accordance with equations (19) and (20). Calculations are again made for the tension value $F_o$ at the stopping point 62. It will be apparent that the values of mean torque $T_m$, torque rate TR, $\alpha_F$, $\alpha_{origin}$, $F_o$ and the like may be revised as many times as desirable. It is also conceivable not to conduct the second pass under some circumstances.

Quality Control Procedures—Torque Rate Curvature

One of the defects in the technique heretofore described is the assumption that the empirically determined tension rate $FR_1$ correctly describes the elastic properties of the joint actually being tightened. For good quality joints, the tension rate $FR_1$ does not vary widely. There are, however, a number of relatively common situations, e.g. galled threads, misaligned fasteners, poor contact surfaces, dirt or other foreign particles between the contact surfaces, and the like, where the actual tension rate for the joint being tightened is significantly below the empirically determined tension rate $FR_1$. In such poor quality joints, the actual final tension value will be significantly below the desired tension value $F_D$ and significantly below the final calculated tension value $F_{final}$. To determine the significance of such poor quality joints, two 5/16"-24, SAE grade 8 nuts and bolts were tightened with a shim, 0.015 inches in thickness, inserted from one end under the bolt in order to simulate poor contact due to misalignment. The final desired tension value $F_D$ was 5500 pounds. The actual measured final tension value was 2400 pounds and 1700 pounds for the two fasteners, a percentage variation of $-56\%$ and $-69\%$ from desired. It will accordingly be apparent that the occurrence of such poor quality joints can have a major effect on the scatter seen in fasteners tightened by the technique of this invention. It will also be evident, upon reflection, that such poor quality joints will have a like effect on the scatter in fasteners tightened by a turn-of-the-nut method.

It has been learned that poor quality joints of the type exhibiting abnormally low tension rates can readily be detected by the data encoded and stored during the course of tightening a fastener pair with this invention. In such poor quality joints, the torque rate is not constant in the upper part of the region 18 where the average torque rate TR is calculated, as contrasted to the showing of FIG. 3. Instead, the torque-angle plot is arcuate and, if plotted, is upwardly concave. Thus, it is a relatively simple matter to measure or calculate and then directly compare the average torque rates in the upper and lower parts of the range where the torque rate TR is calculated. For example, in a situation where thirteen data points are being used to calculate TR, with the point 64 being the highest torque value used, the torque rate $TR_a$ over an angle of six $\Delta\alpha$ increments backward from the point 64 would be calculated. The calculations may, of course, be a two point or a least squares technique. Next, the torque rate $TR_b$ over an angle commencing with six $\Delta\alpha$ increments backward from the point 64 and ending twelve increments backward from the point 64 is calculated by a two point or least squares technique. Then, the ratio of $TR_a/TR_b$ is computed. If the ratio of $TR_a/TR_b$ is near unity, e.g. $1\pm0.10$, the conclusion is that the joint has an acceptable tension rate. If the ratio of $TR_a/TR_b$ diverges significantly from unity, e.g. $TR_a/TR_b > 1.10$, the conclusion is that the joint has an abnormally low tension rate $FR_1$ and, if tightened by the technique of this invention or by a turn-of-the-nut method, will result in a fastener stressed substantially below the desired tension value $F_D$. A suitable signal may be displayed at the operator's station, the joint rejected and the parts replaced.

Rather than directly checking the curvature of the torque-angle plot, indirect methods are available. One approach is to compare the values of the calculated mid-point tension $F_o$ in the first pass with that in the second pass. This is, in effect, calculating a first tension value at a predetermined location using a torque rate in a first area, calculating a second tension value at the same location using a torque rate in a second area and then comparing the first and second tension values. If the two values deviate by more than about 13%, joint problems are highly likely. The figure 13% is, of course, somewhat arbitrary. It is based on the expectation of tension control of $\pm10\%$ within three standard deviations, a mean shift of 2% plus 1% for other uncertainties. The selection of 13% rarely produces false signals when parts have reasonable quality. If a better number is available, it should be used.

Quality Control—Torque Rate Too Low

As will be appreciated, the torque rate calculations are conducted on each successive fastener in the same tension range, i.e. $F_L$-$F_H$, the values of which are determined empirically. If the torque rate TR is unusually high, the conclusion is that the fastener pair exhibits very high friction. In the practice of this invention, there is nothing wrong with high friction rates and consequently no upper limit on the torque rate TR is specified. Usually low values of TR are, however, cause for concern. First, the theoretical minimum torque rate TR° is not zero because the tool does reversible work on the joint in the absence of friction by producing tensile stress in the bolt and compressive stress in the clamped pieces and nut. When friction is zero, it can be shown that $$TR^\circ = \left(\frac{w}{2\pi}\right) FR > 0 \tag{29}$$

where TR° is the theoretical minimum torque rate and w is the pitch of the threads. Accordingly, TR° is positive and its value depends on thread pitch and the joint tension rate. The observed torque rate TR is made up of TR° and $TR_f$ which is the friction component. If it is assumed that friction can change at most $\pm60\%$ from its expected value, represented by the typical torque rate $TR_o$, then the minimum expected torque rate $TR_{min}$ under normal conditions can be expressed by:

$$TR_{min} = 0.6 TR^\circ + (1-0.6) TR_o. \tag{30}$$

The factor 0.6, representing a 60% change in friction coefficient, is somewhat arbitrary. If a better estimate is available, it should be used. Whenever a torque rate less than $TR_{min}$ is observed, it indicates a joint problem. This could mean wrong parts, poor contact between the parts, or poor data processing, e.g. if the mid-point tension $F_o$ is far too low. In any event, when the calculated torque rate TR is less than $TR_{min}$, a signal is given to indicate that the joint is rejected. Because this calculation is conducted during the mid-point pause, the tool is already off. Accordingly, the tool is reset for a new tightening cycle. It will be appreciated that this approach is a direct technique for assuring that TR exceeds $TR_{min}$ for acceptable joints.

There are, however, techniques for indirectly detecting very low torque rates. A first indirect technique involves the second pass or second calculations for TR. The second pass requires a value of $n_H$ greater than one. When TR is abnormally low, the first estimate of $F_o$ is very large leading to a value of $n_H$ so great that the location of $F_L$ lies outside the stored data, i.e. $F_L$ appears to lie below the torque storing threshold $T_{sth}$. Another indirect approach is to compare the calculated tension $F_o$ at the mid-point with the final desired tension $F_D$. If they are too close, the observed torque rate TR must be unusually low.

Quality Control—Tool Performance

One of the advantages of the mid-point stop is that one obtains a measurement of the actual amount of tool overrun $\delta\alpha$ occuring between the angular locations 60, 62 corresponding to the torque values $T_4$ and $T_d$. This allows for a check of tool performance. Although the tool overrun at the termination of tightening may be used to determine tool malfunction, this operation is more conveniently and accurately monitored during overrun adjacent the mid-point stop 62.

When the tool is instructed to stop, it takes some time for all motion to cease. For any given tool speed at the time of the shut off command, there exists a given angle of rotation that occurs before all motion ceases. There are two phenomena that affect tool overrun: (1) the time lapse between the issuance of the shut off command and the complete closing of the air control valve, and (2) the rotational inertia of the relevant parts. By selecting appropriately designed rotors, the overrun due to inertia is noticeable only when idling. For purposes of simplicity, tool overrun due to inertia may be neglected.

Figure 4:
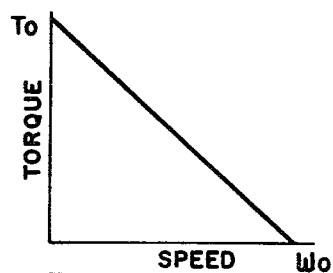
FIG. 4 is an illustration of a typical torque-speed relationship of an air powered tool.

There are accordingly two assumptions in tool overrun calculations: (1) overrun is due solely to time delay and the motor stops immediately after the air supply valve is completely shut off; and (2) the tool has a linear torque-speed curve as shown in FIG. 4 which can be characterized by two parameters, the stall torque $T_o$ and the idle angular speed $\omega_o$ such that:

$$(T/T_o) = 1 - (\omega/\omega_o) \tag{31}$$

where T is the sensed torque at any location and $\omega$ is the angular speed at that location. On this basis, it can be shown that:

$$\delta\alpha_a = \alpha_{or}\left(1 - \frac{T_a}{T_o}\right) = \alpha_{or}\left(\frac{\omega_a}{\omega_o}\right) \tag{32}$$

with only a small error where $\delta\alpha_a$ is the anticipated angular overrun at the time the applied torque is $T_a$, $\alpha_{or}$ is the angular overrun at idle and the tool speed is $\omega_a$ when the applied torque is $T_a$.

In an unregulated pneumatic vane motor, the stall torque $T_o$ varies approximately with $\Delta p$ which is the difference between the absolute air pressure upstream of the tool and atmospheric pressure which is, of course, the equivalent of the gauge pressure upstream of the tool. The speed of the tool varies with $\Delta p^{\frac{1}{2}}$. As shown in application Ser. No. 766,429, now U.S. Pat. No. 4,106,570 filed Feb. 7, 1977, a typical tightening tool used with this invention incorporates an air supply valve which is biased toward the closed position by inlet air pressure and moved toward the open position by a solenoid operator. In this situation, the time required to close the valve after energization of the solenoid decreases as gauge pressure increases. This relationship is approximately $\Delta p^{-\frac{1}{2}}$. If the line pressure changes, $\alpha_{or}$ remains substantially constant while the stall torque $T_o$ varies linearly. On this basis, the actual tool overrun $\delta\alpha$ at the mid-point 62 is a measure of the actual stall torque. If:

$$T_s = T_o(1 + \epsilon) \tag{33}$$

where $T_s$ is the actual stall torque in any particular tightening cycle and $\epsilon$ is the relative change observed in stall torque. It can be shown that:

$$\epsilon = \frac{y}{1-z} - 1 \tag{34}$$

where $$y = \frac{T_a}{T_o}; \tag{35}$$

$$z = \frac{\delta\alpha}{\alpha_{or}}. \tag{36}$$

$T_a$ and $\delta\alpha$ are measured and are accordingly known at the mid-point 62. $\alpha_{or}$ and $T_o$ are fixed input values. If $\epsilon$ is negative, the tool is underperforming and, if positive, the tool is overperforming.

Although equation (31) is set up on the basis of line pressure changes, it remains meaningful if changes in stall torque are related to lack of lubrication, blade abnormalities or impending bearing failure. The microprocessor will in each case calculate $\epsilon$ and, if it is less than a prescribed negative such as $-0.25$, then a signal is generated to indicate at the operator's station that the tool has underperformed. If tool underperformance occurs too frequently, as pointed out more fully hereinafter, this may also be displayed indicating the existance of a systematic problem requiring attention.

In the alternative, let $$y_1 = \frac{T_1 + \alpha_1 TR}{T_o}; \tag{37}$$

$$z_1 = \frac{\delta\alpha}{2\alpha_{or}}; \text{ and} \tag{38}$$

$$\epsilon_1 = 100 \frac{y_1 + 2z_1 - 1}{1 - z_1} \%. \tag{39}$$

where $\alpha_1$ is the angular distance (FIG. 3) from $T_1$ to the shut off point 60. It will be apparent that $y_1$ is a dimensionless number and basically is the ratio of $T_4/T_o$. As shown in FIG. 3, $T_4$ is the existing torque value at the mid-point shut off location 60 while $T_o$ is the normal stall torque. It will be seen from FIG. 4 that $y_1$ is an inverse function of tool speed. If the time delay between the giving of the shut off command and the closing of the valve remains constant, $y_1$ is a prediction of tool overrun. Since $\delta\alpha$ is the measured tool overrun, it will be seen that $z_1$ is a function of measured tool overrun while $\alpha_{or}$ is the normal angular overrun of the tool under no torque conditions. $\epsilon_1$ will be recognized as a percentage change in tool and control performance.

If $\epsilon_1$ is low, for example, $\leq -10\%$, the deduction is that actual stall torque has decreased significantly, such as from a loss or decline in air pressure, lack of lubrication, worn or broken parts, or the like. In such an event, a signal may be displayed at the tool location to indicate that the tool requires inspection, maintenance, repair or replacement. It is conceivable, but quite unlikely, that a significant decrease in $\epsilon_1$ could be caused by a decrease in time delay between the shut off command and the air valve closing.

If $\epsilon_1$ is positive, i.e. greater than zero, complications arise. It appears that $z_1$, which is a simplification of a more complex equation, loses accuracy. The more complex equation indicates that if $\epsilon_1$ is positive, $z_1$ should be reevaluated as:

$$z_2 = \frac{\delta\alpha}{\alpha_{or}}. \tag{40}$$

Accordingly, $\epsilon$ should be reevaluated for greater accuracy, when positive, as:

$$\epsilon_2 = 100 \frac{z_2 - 1}{1 - y_1}. \tag{41}$$

If $\epsilon_2$ is high, for example $\geq +10\%$, the deduction is that the time delay between the shut off command and the air valve closing has decreased significantly or that air pressure supplied to the tool has increased. This normally indicates that the valve control solenoid is beginning to stick or that air pressure is too high. In such event, a signal may be displayed at the tool location to indicate that the air control system requires inspection, maintenance, repair or replacement. It is conceivable, but quite unlikely, that a significant increase in $\epsilon_2$ could be caused by increased tool efficiency.

As will be apparent to those skilled in the art, the prediction of tool overrun embodied in equation (37) does not include a measure of overrun based on inertia, but instead based solely on time delay. As mentioned previously, inertial overrun is rather insignificant with moderate to high torque rate fasteners although accuracy can be improved somewhat for low torque rate fasteners by including an inertial overrun provision. In the event that it is desirable, a measure of inertial overrun can be incorporated into equation (39) through one or both of equations (37) or (38).

It is apparent that a single indication of tool malfunction is probably not significant but that an abnormal frequency of tool malfunction is significant. Thus, a running ratio of $$\frac{C_{TL}}{C_J} \geq C \tag{42}$$

is maintained where $C_{TL}$ is the number of times that $\epsilon \leq -10\%$, $C_J$ is the number of joints tightened and C is a fraction acceptable to the user. The ratio $C_{TL}/C_J$ is preferably a running ratio, as by storing on a first-in, first-out basis, rather than a cumulative ratio. From present information, it appears that C should be in the range of 0.1–0.2, for example 0.15.

Similarly, a running ratio of $$\frac{C_{TC}}{C_J} \geq D \tag{43}$$

is maintained where $C_{TC}$ is the number of times that $\epsilon \geq +10\%$ and D is a fraction acceptable to the user, for example, 0.15.

Another approach for predicting tool overrun and thereby detecting tool malfunction is pointed out by:

$$\alpha_p = \left(1 - \frac{T_4}{T_o}\right)\alpha_{or} \tag{44}$$

where $\alpha_p$ is the predicted tool overrun from the shut off command point 60 where the torque value $T_4$ appears. The measured value of overrun $\delta\alpha$ from the point 60 can be compared against $\alpha_p$, as follows:

$$H \leq \frac{\delta\alpha}{\alpha_p} \geq G \tag{45}$$

where H and G are values acceptable to the user, such as 0.85 and 1.15 respectively. When measured overrun $\delta\alpha$ is too small, this indicates a motor malfunction while if $\delta\alpha$ is too large, it indicates a control system malfunction.

Quality Control—Non-linear Strain

Another quality control procedure employed at the mid-point stop 62 is the detection of non-linear strain, whether elastic or plastic. If non-linear strain occurs before the mid-point stop, it could be detected by any of the following indirect techniques. First, if the joint is deeply within the plastic zone, the torque rate calculations will be askew so that an attempt will be made to search for torque data outside the memory. This indirect method is similar to indirectly determining whether the torque rate TR is abnormally low and will cause the joint to be rejected. Second, the joint might be rejected because the observed torque rate TR is less than the minimum expected torque rate $TR_{min}$. Third, it is possible that the joint will be rejected because the torque-angle plot is not linear but is instead demonstratably arcuate. In addition to or in lieu of relying on indirect techniques for detecting excessive non-linear strain, it is desirable to directly determine if it has been experienced by the fastener.

Figure 5:
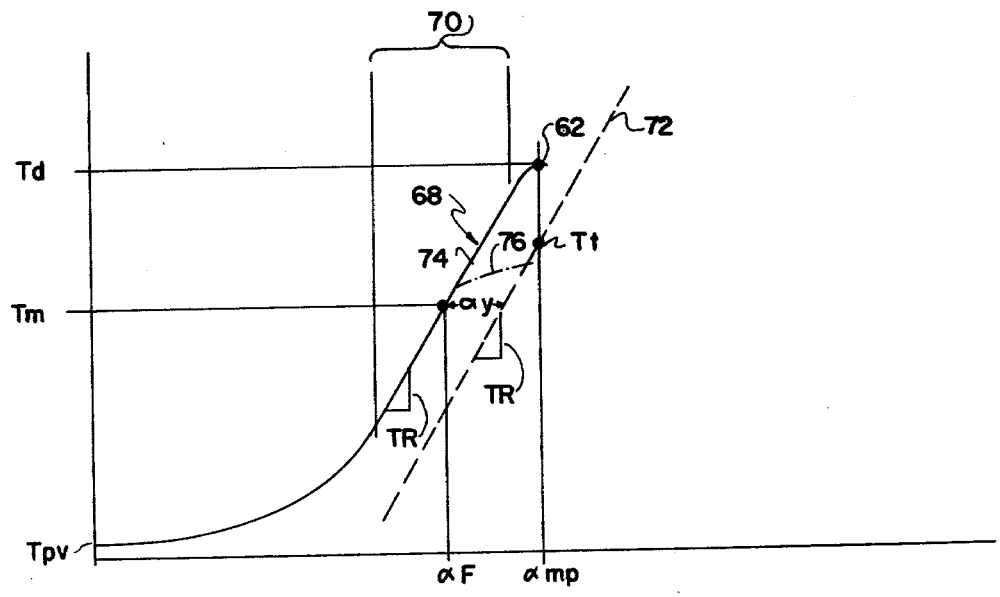
FIG. 5 is a torque-angle diagram illustrating the determination of non-linear strain in the fastener at the mid-point stop.

To this end, a classic yield point determination is made. Referring to FIG. 5, there is illustrated a torque-angle curve 68 which is intended to represent a simplification of the showing of FIG. 3. The curve 68 terminates at the mid-point stop 62 and describes, in the region 70, a torque rate TR. Ideally, and in accordance with classic yield point determinations, an imaginary line 72 is spaced from the location of mean torque $T_m$ and accordingly from the linear region 74 of the curve 68 by an offset angle or offset strain $\alpha_y$. Although the value of $\alpha_y$ may vary as pointed out more fully hereinafter, a typical value to the particular fasteners disclosed immediately preceding Table II is 12°.

The angular location of $T_m$, which is $\alpha_F$, is known as shown in FIG. 3 and as calculated from equation (17). The angular location of the mid-point stop 62 along an abcissa $T_{os}+T_{pv}$ is, of course, the absolute value of $\alpha_{origin}$.

Thus, a torque value $T_t$ on the imaginary line 72 which is used to compare with the torque reading at the mid-point stop 62 is:

$$T_t = T_m + (-\alpha_{origin} - \alpha_F - \alpha_y)TR. \tag{46}$$

In the event that $T_t$ is less than $T_d$, the conclusion is that the joint has not experienced significant non-linear strain. It will be apparent that the value of $T_d$ is suppressed by the act of stopping rotation. Accordingly, if $T_t$ is less than $T_d$, there is great assurance that the joint has experienced no significant non-linear strain. In the event that $T_t$ is equal or greater than $T_d$, the conclusion is that the joint has experienced significant non-linear strain and the joint is rejected. A portion 76 of the torque-angle curve of an unacceptable joint is illustrated as crossing the imaginary line 72 at a torque value below $T_t$.

The actual digital logic for conducting a non-linear strain determination in the region surrounding the mid-point and a determination in the region adjacent the termination of tightening is somewhat complex. Accordingly, a more generalized version may be used which can accomodate both the mid-point and the final determinations.

FINAL SHUT OFF PARAMETER PROCEDURES

It will now be appreciated that the location 62 of calculated tension $F_o$ appearing in the joint corresponds to the point 26 illustrated in the more general showing of FIG. 1. The determination yet to be made is the additional angle $\alpha_{final}$ or the additional torque $\Delta T$ required to achieve the final desired tension value $F_D$. Compared to the manipulations used to assure consistently reliable values for torque rate TR and the angle of tension origin $\alpha_{origin}$, these calculations are relatively straight forward.

Angle Option

One tightening parameter that may be selected to attain the final desired tension value $F_D$ is the additional angle $\alpha_{final}$.

$$\text{if } X \geq 0, \alpha_{final} = \frac{F_D - F_o}{rFR_1}; \text{ and} \tag{47}$$

$$\text{if } X < 0, \alpha_{final} = -X + \frac{F_D - F_M}{rFR_1}. \tag{48}$$

$F_o$ is, of course, obtained from equations (26) or (27) while $F_M$ is the tension value at the break in the tension-angle curve and is determined empirically.

It will be appreciated that the tool overran an angle $\delta\alpha$ when stopping at the mid-point 62. It is equally apparent that some amount of tool overrun will occur approaching the final desired tension value $F_D$. A typical torque-speed curve for an air powered tool is shown in FIG. 4. Since the tool will be slowing down during tightening, it will be apparent that the tool overrun approaching the final desired tension value $F_D$ will be less than the overrun approaching the point 62. Defining, $$\alpha_a = \frac{T_o - T_4}{TR} - \delta\alpha \tag{49}$$

where $T_4$ is the torque value at the point 60 where the initial shut off command was given prior to reaching the stopping point 62, $T_o$ is the stall torque of the tool, TR is the calculated torque rate and $\delta\alpha$ is the measured angle overrun approaching the point 62. The expected tool overrun $d\alpha$ approaching the final desired tension value $F_D$ is:

$$d\alpha = \delta\alpha_a \left(1 - \frac{\alpha_{final}}{\alpha_a}\right) . \tag{50}$$

In the alternative, it can be shown that:

$$d\alpha = \alpha_{or}\left(1 - \frac{T_4'}{T_o}\right) \tag{51}$$

where $T_4'$ is the applied torque at the moment of final tool shut off. The overrun $\delta\alpha$ at the mid-point stop 62 is measured by the angle encoder while its theoretical value is:

$$\delta\alpha_t = \alpha_{or}\left(1 - \frac{T_4}{T_o}\right) \tag{52}$$

where $T_4$ is the torque value at the shut off at the point 60 preceding the mid-point stop 62. Dividing equation (51) by equation (52), a relationship can be found between the two overruns which is independent of $\alpha_{or}$. Accordingly, one can use a semiempirical approach to estimate $d\alpha$. In order to do so, an estimate of the final torque $T_D$ must be provided.

$$\text{if } X \geqq 0, T_D = T_{sp} + u\alpha_{final} \tag{53}$$
$$\text{if } X < 0, T_D = T_{sp} + u\alpha_{final} + X(u - TR) \tag{54}$$

where $$u = rRTR \tag{55}$$

and R is defined as $TR_2/rTR$. Consequently, equation (55) reduces to the proposition that $u = TR_2$.

It can be shown that the semiempirical relationship between final and mid-point overruns is:

$$d\alpha = \frac{T_o - T_D}{T_o - T_{sp} + (1 - rR)(T_{sp} - T_4)} . \tag{56}$$

Regardless of how the amount of final overrun $d\alpha$ is determined, the shut off command to the tool is given at an angle location $\alpha_{final}$-$d\alpha$. Overrun of the tool causes the fastener to move to the final angle location $\alpha_{final}$. The next problem is where to commence the measurement of the angle increment $\alpha_{final}$-$d\alpha$. The problem has two components: the effect of joint relaxation and the effect of a transient rise in torque during restarting.

It has become apparent that a typical joint will relax, i.e. lose tension without unthreading of the fasteners, at the mid-point stop 62 and/or at the termination of tightening. If the fasteners were continuously tightened, i.e. without a mid-point stop, the relaxation at termination of tightening can be rather significant while, with a mid-point stop, the relaxation at termination of tightening is quite modest. By stopping at the mid-point 62, the bulk of joint relaxation occurs prior to the resumption of tightening. Thus, the stopping at the mid-point 62 provides greater consistency in final joint tension although this phenomenon complicates the determination of the final shut off parameter, or more correctly, complicates the determination of where to commence measuring the final angle of advance.

If the joint did not relax at the mid-point stop 62, the tool would be instructed to go an additional angle $\alpha_{final}$-$d\alpha$ beyond the mid-point stop 62 where the final shut off command would be given. As shown in FIG. 1, the final shut off command would occur at about the point 78 whereby the tool overruns to tighten the fastener pair through an angle $d\alpha$ until stopping at the final desired tension value $F_D$.

Figure 6:
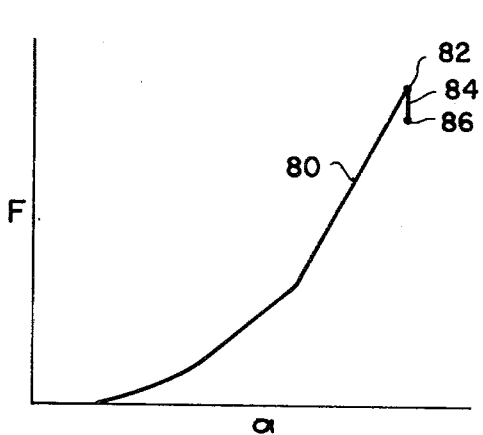
FIG. 6 is an illustration of a typical tension-angle curve representing the relaxation of a joint at the termination of continuous tightening.

The phenomenon of joint relaxation is illustrated in FIG. 6 where the curve 80 represents the tension-angle relationship during continuous tightening to a location 82 below the elastic limit of the fastener. When tightening stops, the joint relaxes as suggested by the tailing off of tension along a constant angle line 84. The final tension appearing in the fastener is accordingly at the point 86. A typical value for joint relaxation along the line 84 is 7% of joint tension within twenty-one hours.

Figure 7:
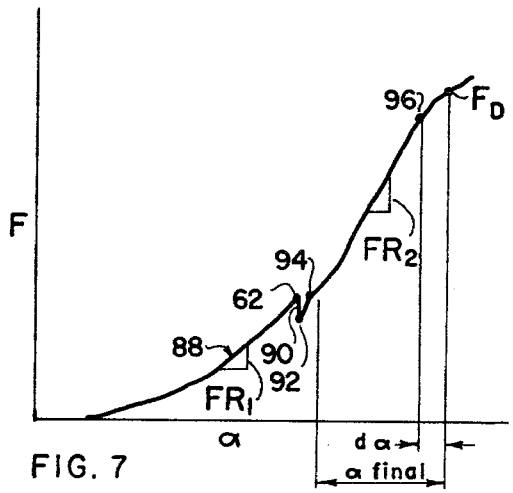
FIG. 7 is an illustration of a typical tension-angle curve representing the relaxation of the joint at the mid-point stop during tightening to a higher tension value.

Referring to FIG. 7, the curve 88 represents the tension-angle relationship during tightening to the mid-point stop 62. Because the joint relaxes, tension in the fastener tails off along a constant angle line 90 to a tension value at the point 92.

One technique for accomodating joint relaxation is, instead of instructing the tool to go an additional angle $\alpha_{final}$-$d\alpha$ from the mid-point stop 62, to advance the fasteners an additional angle $\alpha_{final}$-$d\alpha$ after the running torque equals or exceeds $T_{sp}$ where $$T_{sp} = T_3 + TR(\Delta\alpha) \text{ in the event that } X \leqq 0, \text{ or} \tag{57}$$
$$T_{sp} = T_3 + u(\Delta\alpha) \text{ in the event that } X > 0. \tag{58}$$

$T_{sp}$ will be recognized as the calculated torque value which would be expected at the mid-point 62 except for the effect of stopping. It will be recollected that the torque value $T_3$ is located at the point 64, which is one $\Delta\alpha$ backward from the mid-point stop 62. By advancing the tool until running torque equals or exceeds $T_{sp}$, the torque and tension values at the mid-point stop 62, before relaxation occurs, are essentially reproduced. This is indicated in FIG. 7 where the point 94 designates the location where running torque is equal to or greater than $T_{sp}$. Tightening will then be done correctly, regardless of prevailing tension in the bolt at the time the tool resumes tightening. As shown in FIG. 7, the final shut off command occurs at the point 96 whereby the tool overruns to tighten the fastener pair through an angle $d\alpha$ until stopping at the final desired tension value $F_D$. In order to shift the bulk of joint relaxation from the final stopping point to the mid-point stop 62, the mid-point stop is at least 0.4 of yield strength and conveniently is in the range of 0.4-0.75 yield strength. With the mid-point stop 62 so located, typical joint relaxation at the final stopping point is on the order of $\frac{1}{2}$-2% of final bolt tension within one hour. It should be clear that this amount of joint relaxation is the relaxation of a good quality joint rather than a joint suffering from misaligned parts, compressed gaskets and the like.

Figure 9:
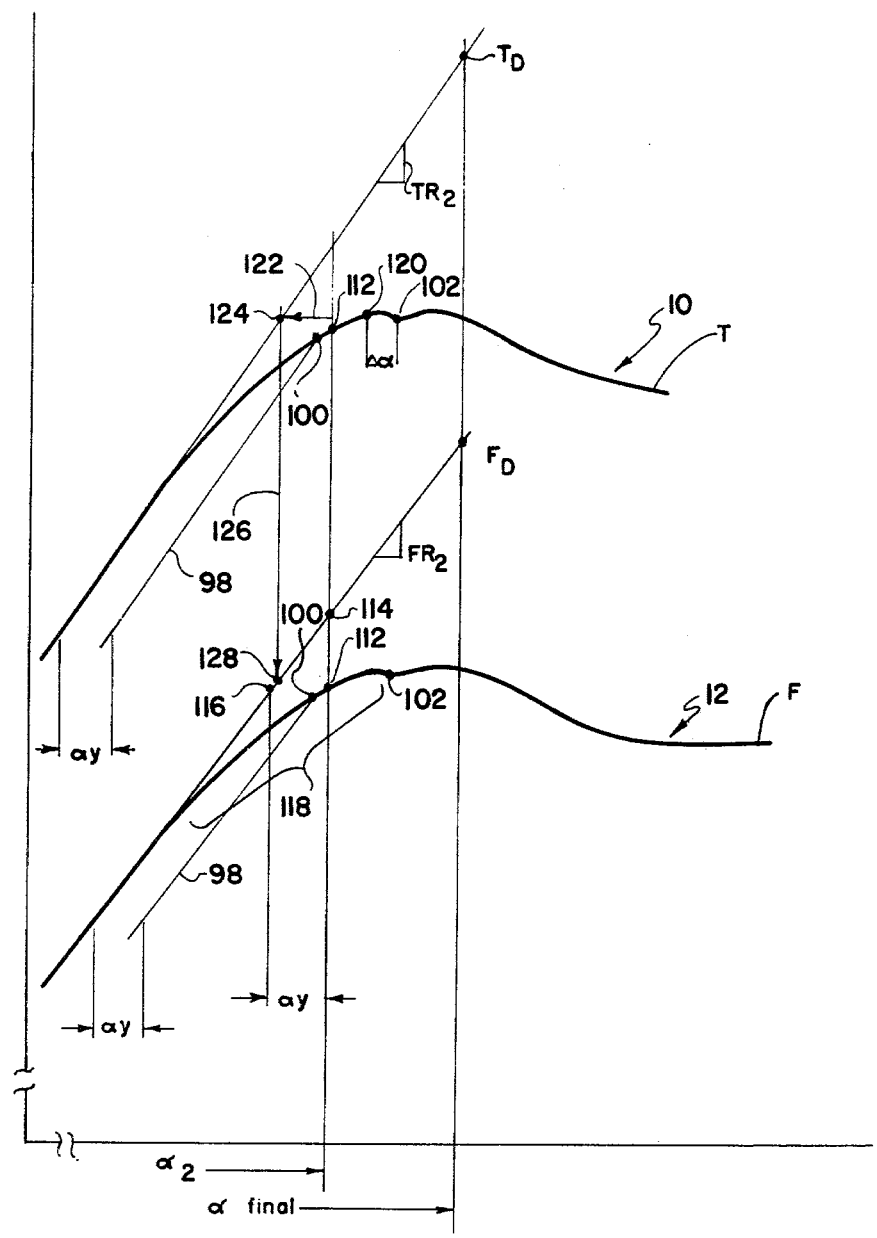
FIG. 9 is an enlarged illustration of torque-angle and tension-angle curves graphically explaining another facet of the invention.

Although measuring the angle of advance from $T_{sp}$ provides better results than merely measuring the advance from the mid-point stop 62, the results can be further improved upon. Accordingly, a preferred technique for accommodating joint relaxation, accommodating a transient torque rise immediately on restart and to take up any gear-socket backlash is to advance the where $\alpha_2$ is the angle from the stopping point 102 to the location where yield detection is sensed. It will be appreciated that any calculated value of $F_{final}$ is somewhat of an approximation since the tension rate well above the proportional limit is unknown and perhaps unknowable with any degree of accuracy. FIG. 9 graphically illustrates the difficulty. If the final tension value were calculated:

$$F_{final} = F_D - rFR_1(\alpha_{final} - \alpha_2) \tag{86}$$

the tension actually being calculated would be at the point 114 which is at the same angular position $\alpha_2$ from the stopping point 102 as the yield detection point 112. It will be appreciated that the difference in tension values between the points 112, 114 may be significant in some circumstances. Since it is known that the tension rate falls off substantially immediately prior to the point 100, it is safe to calculate the tension value at the point 116 which is spaced downwardly along the slope $FR_2$ by an angular distance $\alpha_y$. Thus, the rationale for the equation (86) is apparent. It will be appreciated that the actual final tension appearing in the joint is that at the point 112 which differs from the calculated tension value appearing at the point 116. It will be seen, however, that the tension value at the point 116 is a substantially better estimation of actual final tension than is the tension that would be calculated at the point 114. This is particularly true since the tension rate in the range 118 is known to be quite low. The final tension value $F_{final}$ along with a notation that the bolt has yielded may be displayed at the tool location, printed or otherwise recorded for further use or analysis.

In the event the torque governed final shut off parameter is being used, when $T>T_y$, non-linear strain is detected and a shut off command is given the tool. The final tension value may be calculated from a torque approach, as follows:

$$F_{final} = F_D - \frac{FR_1(T_D - T_{final})}{R(TR)} \tag{87}$$

where $T_{final}$ is the highest value of torque sensed within one or two $\Delta\alpha$ increments before the final stopping place 102. This is likewise illustrated in FIG. 9. The detection of yield occurs at point 112 on the torque curve 10 which the point 102 being the final stopping point. The torque at the point 102 is unreliable for the same reasons that the torque reading at the mid-point stop 62 is unreliable. Accordingly, the torque value $T_{final}$ is taken as the peak within one or two $\Delta\alpha$ increments backward from the point 102, such as at the point 120. The effect of this, graphically, is shown by the horizontal line 122 terminating on the torque slope $TR_2$ at the point 124 and the vertical line 126 terminating at the point 128 on the tension slope $FR_2$. Thus, the final tension value $F_{final}$ is the calculated tension at the point 128.

In the alternative, the following estimate is fairly accurate:

$$F_{final} = F_D - \left( \frac{T_{mm} + u\alpha_{final} - T_{final}}{u} \right) rFR_1 \tag{88}$$

where $T_{mm}$ is $T_{sp}$ provided that $T_{sp} \geq T_{mm'}$ where $T_{mm'}$ is $T_m + TR(-\alpha_{origin} - \alpha_F)$. If $T_{sp} < T_{mm'}$ then $T_{mm} = TR(-\alpha_{origin} - \alpha_F)$.

In the event the tool continues to run far beyond any reasonable angle of advance, the conclusion is that the bolt has failed without yield detection, as may occur before the mid-point stop 62. Thus, no appreciable tension appears in the bolt and $$F_{final} = 0. \tag{89}$$

Final Tension Check

In any circumstance where $F_{final}$ is calculated, it may be desirable to compare it with the final desired tension value $F_D$. In this event, if $$\left| \frac{F_{final} - F_D}{F_D} \right| \leq B \tag{90}$$

where B is a fraction deemed acceptable to the user, a suitable signal may be displayed to indicate that calculated tension is substantially below desired tension. From present information, it appears that the magnitude of B should be greater than the expected scatter from use of this invention and preferably should be 3-4 normal deviations. Thus, B should be in the range 0.10-0.17.

Final Tension Consistency Check

Another approach of this invention is to normally terminate tightening in response to one parameter, e.g. torque, and check this shut off parameter against another shut off parameter, e.g. angle. If the results compare closely, this is an indication that the assumptions made, the empirically determined joint parameters and the like are reasonably correct. If the comparisons are significantly different, this is an indication that something is amiss and that the operation should be stopped or investigations instituted to determine the cause. When using torque as the tightening parameter, $F_D$ has been placed in the calculations for the final torque value $T_D$ by equation (53) or (54) depending on whether $X \geq 0$ or $X < 0$. The calculated value of final tension $F_{final}$ using an angle approach at a final angle of advance of $\alpha_{final}$ is:

$$F_{final} = F_D - rFR_1(\alpha_{final} - \alpha_{actual}) \tag{91}$$

where $\alpha_{actual}$ is the angle of advance from $T_{sp}$ or $1.08T_{sp}$ to the final stopping point. If the different between $F_D$ and $F_{final}$ is small, e.g. $\pm 5-10\%$, it is apparent that substantial confidence may be placed in the technique. If the difference between $F_D$ and $F_{final}$ is larger, e.g. $\pm 20\%$, it is apparent that something is amiss and that the tightening operation should be stopped or investigations instituted to determine the cause.

Final Torque Consistency Check

Assuming that the final advance of the fastener was determined in terms of angle and the joint has not experienced non-linear strain, a check of the value of the actual final peak torque $T_{final}$ against a calculated value of the expected final torque $T_D$ provides an independent evaluation of the procedures. In order to make this determination, preliminary calculations are made. First, the actual attained final tension value $F_{final}$ differs from the expected tension value $F_D$ only if the actual amount of tool overrun is different from the estimate $d\alpha$. The actual attained tension value is $$F_{final} = F_D + (\alpha_{actual} - \alpha_{final})rFR_1 \qquad (92)$$

where $\alpha_{actual}$ is the actual observed angle from $T_{sp}$ or $1.08T_{sp}$. This calculation will provide a value for actual attained tension for $F_{final}$. Realizing that the actual attained tension value $F_{final}$ will differ from $F_D$, a correction is made in the expected value of final torque $T_D$, as follows:

$$T_D' = T_D \frac{F_{final}}{F_D} \qquad (93)$$

where $T_D'$ is the revised value of $T_D$. The value of $T_D'$ must be comparable with $T_{final}$. A torque-angle consistency factor $\eta_T$ is then defined as $$\eta_T = \frac{T_D - T_{final}}{T_D}. \qquad (94)$$

Ideally, $\eta_T$ should be zero. It will be appreciated, however, that minor deviations in $\eta_T$ from zero are not indicative of any substantial problem. In good quality joints, it has been found that values of $\eta_T$ on the order of about 0.13 rarely give false indications of defective joints. Accordingly, this value is used. If a better value is available, it should be used instead. Thus, a joint is judged defective in the event that $$-0.13 \leq \eta_T \geq 0.13, \qquad (95)$$

the tool is reset for the next tightening cycle and a signal is given that the joint has failed. In the event that parts quality is known to be subnormal, the value of $\eta_T$ should be increased somewhat.

This quality control procedure causes the rejections of joints experiencing thread galling, joint where the mid-point analysis, for some reason, is performed in a very low tension range, joints which yield and the non-linear strain procedures do not detect if, joints tightened with faulty torque or angle instrumentation, or joints tightened with incorrect input parameters fed to the microprocessor.

Final Torque Rate Consistency

This quality control procedure is intended to provide additional insurance against a fairly flat torque-angle curve near the termination of tightening which may possibly indicate significant penetration of the plastic zone somehow not detected by other routines. In this procedure, the final torque rate is checked against the empirically determined torque rate u or $TR_2$ within the angle interval of actual tool overrun. Defining, $$FRC = \frac{T_{final} - T_{marker}}{u} \qquad (96)$$

where $T_{marker}$ is the torque sensing at the shut off command and $T_{final}$ is the peak torque value sensed in the last few $\Delta\alpha$ increments prior to stopping. If FRC is less than some suitable value, e.g. 0.25, the joint is indicated as failing this procedure. This procedure has its difficulty because the value of $T_{final}$, which is the peak value of torque within one or two $\Delta\alpha$ increments from the final stopping point, is influenced by the act of stopping rotation for the same reason that the last torque readings prior to the mid-point stop 62 are suspect. Experience indicates that if joints are rejected when FRC<0.25, there is a false indication of joint inacceptability approximating a 1% frequency. This is believed to be caused in large part by the suspect value of $T_{final}$. The procedure does, however, have its value in providing considerable assurance against premature yielding if that is of paramount concern to the user.

Frequency of Joint Rejections

It is desirable to indicate a parts integrity problem when the number of joints that have failed at least one of the quality control procedures is too frequent. In other words, the joint failure frequency determinations are desirably merged into one single frequency determination. The difficulty to be avoided is, of course, counting twice a joint which fails two of the quality control procedures. Under normal circumstances, this is not a substantial problem because the quality control procedures are conducted sequentially and not simultaneously. Accordingly, any joint that fails a single test causes the cycle to terminate and the tool to be reset for the next succeeding tightening cycle. Accordingly, when $$\frac{C_{FTR} + C_{TRC} + C_{TRL} + C_{NM} + C_{NLS} + C_F + C_{NF} + C_{TC} + C_{FT}}{C_J} \geq J \qquad (97)$$

a signal is generated to energize a parts integrity indicator, where $C_{FTR}$ is the number of failures of the final torque rate check, $C_{TRC}$ is the number of failures of the torque rate curvature check, $C_{TRL}$ is the number of occurrences where the torque rate is too low, $C_{NM}$ is the number of failures of the non-linear strain determination at the mid-point stop 62, $C_{NLS}$ is the number of times that tightening is terminated in response to non-linear strain rather than in response to the normal tightening parameter, $C_{NF}$ is the number of failures of the final non-linear strain determination, $C_F$ is the number of failures of the tension check, $C_{TC}$ is the number of failures of the tension consistency check, $C_{FT}$ is the number of failures of the final torque consistency check, $C_J$ is the number of joints tightened and J is a fraction acceptable to the user. It will be apparent, of course, that a number of these quality control procedures may be omitted from any particular application and consequently will have no bearing on this frequency check. It is preferred, as in other frequency checks, that $C_J$ be a finite running number of joints stored on a first in, first out basis. The quantity selected for this finite number should be sufficiently large to avoid statistical aberrations and accordingly is preferably on the order of 50–500. The value of J is inversely related to the selected quantity of $C_J$ in the sense that the higher the value for $C_J$, the lower may be the selected value of J. From present information, it appears that J should be on the order of about 0.05–0.20 and is preferably about 0.10 to avoid giving false indications of a systematic parts problem when none exists.

mediately prior to the mid-point stop 62 as is caused by the difference between the static and dynamic coefficients of friction and complicated dynamic factors. When the sensed value of running torque T first equals or exceeds the value of $T_M$ where:

$$T_M = T_3 + TR(\Delta\alpha - X) \tag{73}$$

this location is marked and two $\Delta\alpha$ increments beyond this location, which is location 104, the running torque T is sensed and stored as $T_5$. $T_M$ will be recognized as a calculated torque value which appears at the location on the torque-angle curve corresponding to the break in the tension curve.

Figure 8:
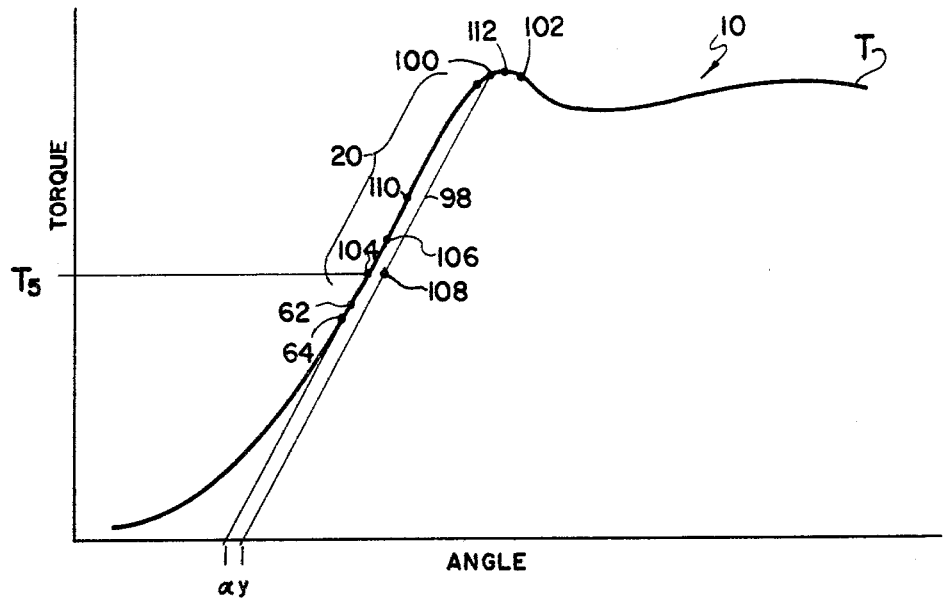
FIG. 8 is a torque-angle diagram illustrating the determination of non-linear strain in the fastener during tightening toward a final tightening parameter.

As is apparent from FIG. 8, the calculations being done to detect the yield point or, in the alternative, an amount of non-linear strain below the yield point, occur in the region 20 where the torque rate is somewhat lower than the torque rate value calculated in the region 18. The torque rate in the region 20 can be expressed in accordance with equation (55).

Yield or non-linear strain calculations can be conducted periodically during tightening in the region 20 as often as is deemed desirable. Although the calculations can be done at every angle increment $\Delta\alpha$, results are quite satisfactory if done every other angle increment $\Delta\alpha$. Accordingly, $$\Delta T_1 = 2u(\Delta\alpha) \tag{74}$$

$$\Delta T_y = u\alpha_y \tag{75}$$

where $\alpha_y$ is the angle corresponding to a desired strain level which can either be elastic but non-linear or plastic, $\Delta T_1$ is the incremental torque over the incremental angle $2\Delta\alpha$ and $\Delta T_y$ is the incremental torque over the incremental angle $\alpha_y$. By selecting small values for $\alpha_y$, the shut off command will tend to be in the elastic but non-linear range below the yield point. If $\alpha_y$ is selected to be a large value, the shut off point will appear in the plastic range above the yield point. It is thus apparent that the detection of non-linear strain can encompass both elastic and plastic strain. The only difficulty is selecting very small values for $\alpha_y$ is that noise in the torque curve 10 in the range 20 might create a premature and false yield signal. At a point 106, which is two $\Delta\alpha$ degrees after the occurrence of $T_5$, the value of running torque T is compared with $$T_{y1} = T_5 - \Delta T_y + \Delta T_1 \tag{76}$$

It is apparent that $T_{y1}$ is a torque value on the line 98 at the point 108. If $T > T_{y1}$, tightening continues. At a point 110, which is two $\Delta\alpha$ degrees beyond the point 106, the value of running torque T is compared with $$T_{y2} = T_{y1} + \Delta T_1 \tag{77}$$
$$= (T_5 - \Delta T_y + \Delta T_1) + \Delta T_1. \tag{78}$$

If $T > T_{y2}$, tightening continues. This procedure continues by adding an additional torque value $\Delta T_1$ to the preceding value of $T_y$ at angle increments of two $\Delta\alpha$. In the event that $T \leq T_y$ before the occurrence of the shut off command derived from the normal tightening parameter of torque or angle, a shut off command is given to the tool. It will be apparent that the actual shut off command from detection of non-linear strain or the actual detection of non-linear strain will not occur at exactly the point 100 since comparisons are being made every two $\Delta\alpha$. Thus, the actual yield detection will probably occur later, e.g. at the point 112 as shown in FIG. 8.

Thus, tightening is normally terminated in response to a torque governed, an angle governed or a mixed shut off command, but in the case of yield point detection or, in the alternative, detection of non-linear strain below the yield point, a premature shut off command is given. It will accordingly be apparent that the upper end of the scatter band is eliminated by a secondary yield point shut off. Thus, the total scatter will be reduced. It will also be apparent that the detection of non-linear strain may be conducted as disclosed in U.S. Pat. Nos. 3,643,501 or 3,693,726, although the technique herein disclosed is deemed preferable.

It will be appreciated that the non-linear strain detection conducted at the mid-point stop 62 is conceptually the same as the determination made during tightening toward the final desired tension value. The details of the determination as here disclosed are somewhat different. In order to simplify the program, it may be desirable to utilize a common approach.

It has been discovered that tightening can be consistently terminated in response to non-linear strain in the elastic region provided that certain precautions are taken. It is essential that a reliable value be obtained for the average torque rate of the fastener being tightened. Necessary to obtaining a reliable torque rate is conducting the calculations over an angle increment of significant size relative to the angular distance between the origin of stress and the proof load of the fastener. Typically, the minimum angle increment over which torque rate calculations are conducted should be in the range of 10–20% of this angular distance. Torque rate determinations made over smaller angle increments tend to be unduly influenced by noise in the torque signal. Another desirable feature is avoiding a two point torque rate calculation and instead using an averaging technique using at least 5 and preferably 10 different data points in order to minimize the effect of a single unusual torque sensing on the calculated torque rate. The approach of this invention is particularly suited to terminating tightening in response to non-linear strain in the elastic zone because of the pains taken to obtain a consistently reliable average torque rate. It will be appreciated that this feature is of considerable importance because of the desire of joint designers to achieve high tension stresses in the bolts without advancing threading into the zone of plastic deformation.

PROCEDURES AT TERMINATION

Frequency of Shut Off Due to Non-linear Strain

It is preferred that the selection of $F_D$ will be low enough so that the cutoff due to detection of non-linear strain will be rare, e.g. 0.1%. In the event that the percentage of premature tightening termination due to non-linear strain detection rises substantially during a production run, this indicates that the fasteners, i.e. bolts and/or threaded parts, employed do not meet design specifications. Accordingly, a high percentage of non-linear strain detections is a signal that quality control investigations need to be conducted on the fasteners employed. For example, if the normal occurrence of non-linear strain is on the order of 0.1%, and a running average of non-linear strain detections is 10%, it is likely that the fasteners being run do not meet specifications.

To identify batches of fasteners which do not meet specifications, a running count of the number of joints tightened is maintained and a running count of the number of joints exhibiting non-linear strain is maintained. A frequency determination is accordingly made, as follows:

$$\frac{C_Y}{C_J} \geqq A \qquad (79)$$

where $C_J$ is the number of joints tightened, $C_Y$ is the number of joints experiencing non-linear strain and A is some fraction acceptable to the user. From present information, it appears that the value of A should be in the range of 0.10–0.20, e.g. 0.15. The ratio of $C_Y/C_J$ is preferably a running ratio, rather than a cumulative ratio, as by storing, on a first-in, first-out basis, a finite number of joints tightened $C_J$, e.g. 30, and any instances of non-linear strain detection $C_Y$. When the running ratio of $C_Y/C_J$ equals or exceeds the selected value A, a suitable signal may be provided indicating that the frequency of non-linear strain is much too high. The investigations to be conducted normally include analysis of the strength and material composition of the fasteners, a technique well known in the art.

When to Conduct Extensive Quality Control Procedures

It will be appreciated that termination of tightening may occur normally, i.e. in response to the final shut off parameter, may occur in response to the detection of non-linear strain during tightening toward the final shut off parameter, may occur because the mid-point tension $F_o$ is too close to the final desired tension value $F_D$ or may occur in response to one of the quality control procedures done at the mid-point 62. If tightening is terminated because the mid-point tension $F_o$ is too close to $F_D$ so that the tool cannot be restarted, one of two conclusions can be reached: (1) the joint has an unusually low value for torque rate TR and should be rejected or (2) the joint is acceptable provided that $F_o$ passes the final tension check discussed hereinafter. The decision depends on the other quality control procedures conducted at the mid-point 62 and the decision of the system designer. In the circumstance where tightening is terminated because the joint is rejected by one of the quality control procedures, nothing further needs to be done. Accordingly, there are two situations where extensive quality control procedures are desirable, i.e. when tightening is terminated normally and when tightening is terminated in response to the detection of non-linear strain occurring after the mid-point stop 62.

Final Tension Determination in the Elastic Zone

It is desirable to calculate and store the final tension appearing in a fastener, the tightening of which is terminated normally, i.e. in response to torque and/or angle rather than non-linear strain. When using a torque approach, equation (87) gives a value for $F_{final}$ regardless of whether yield has occurred or not. When using an angle approach, the final achieved tension value may be calculated from:

$$F_{final} = F_D - rFR_1(\alpha_{final} - \alpha_{actual}) \qquad (80)$$

where $\alpha_{actual}$ is the actual measured angle increment between the $T_{sp}$ or $1.08T_{sp}$ and the final stopping point.

Final Tension at Tool Stall

It is also desirable to calculate and store final tension appearing in a fastener in other circumstances, such as when the tool stalls. Tool stall may occur before the mid-point stop 62 or after. Before the mid-point stop 62, $$F_{final} = F_o. \qquad (81)$$

After the mid-point stop 62, the final desired tension value $F_{final}$ may be calculated using a torque approach as:

$$F_{final} = F_o + \frac{FR_1}{R(TR)}(T_{final} - T_{sp}) \qquad (82)$$

where $T_{sp}$ is the calculated torque at the mid-point stop by equation (57) and $T_{final}$ is the last highest torque sensing obtained within one or two $\Delta\alpha$ increments of the final stopping point.

After the mid-point stop 62, the final desired tension value $F_{final}$ may alternatively be calculated, using an angle approach, as:

$$F_{final} = F_o + rFR_1\alpha_{actual}, \text{ where } X > 0 \qquad (83)$$

where $\alpha_{actual}$ is the actual measured angle from $T_{sp}$ or $1.08T_{sp}$ to the final stopping point.

Non-linear Strain Detection

This is a theoretically redundant check on the possible occurrence of excessive non-linear strain. The joint is rejected or indicated as having experienced excessive non-linear strain in the event that:

$$T_{final} \leqq T_m + TR(-\alpha_{origin} - \alpha_F) + u(\alpha_{actual} - \alpha_y) \qquad (84)$$

where $T_m$ is the mean torque value at the angle location $\alpha_F$. It will be recollected that $\alpha_{origin}$ is a negative value thereby requiring the minus sign. The technique is basically to add a calculated torque value to the mean torque $T_m$ to obtain a calculated torque value at the mid-point stop and then add another calculated torque value representing the additional increase in torque from the mid-point stop to the final stopping place which occurs at the angle sensing $\alpha_{actual}$. If this calculated value is equal to or greater than the highest torque sensing $T_{final}$ obtained within one or two $\Delta\alpha$ increments of the final stopping place, the joint is flagged.

Final Tension Determination in the Plastic Zone

It is highly desirable to calculate and store the final tension appearing in a fastener which has been stopped prematurely because of non-linear strain detection. It may be that the final tension value achieved is well within an acceptable range. In this event, it would be disadvantageous to require removal and replacement of the fastener pair if the problems associated with marginally yielded fasteners are not material if the fasteners are sufficiently stressed to assure acceptable joint conditions.

Accordingly, when using an angle approach, the value of final tension may be calculated as follows:

$$F_{final} = F_D - rFR_1(\alpha_{actual} + \alpha_y - \alpha_2) \qquad (85)$$

Repair of Failed Joints

When a joint is rejected by the tightening technique of this invention, it is highly likely that at least one part constituting the joint is not up to specifications. In such cases, it is highly desirable that defective parts be replaced and the tightening process repeated. However, if the user so wishes, rejected joints can be automatically tightened to a different parameter and the shut off command given. Because of the stored values of torque and angle, it is conceivable that the repair technique could comprise a turn-of-the-nut approach so that the tool could be instructed to advance a predetermined number of degrees beyond a particular torque location. It appears, however, that a turn-of-the-nut approach is not the most desirable for repairing failed joints. Instead, it is preferred that the rejected joints be tightened to a specified minimum torque and the shut off command given. Because of overrun, the final torque achieved would be somewhat greater than the minimum specified. This could, of course, be accomodated by making a simple overrun prediction along the lines of equation (64). It is apparent that this procedure is applicable to joints tightened in accordance with this invention using either the torque or angle option or tightened in accordance with a turn-of-the-nut strategy.

Shear Joint Routine

In joints which are subjected to significant axial loads, i.e. loads parallel to the bolt axis, the only object of tightening is to induce a desired tensile stress in the bolt. This is not precisely true in joints where all or a substantial fraction of the external load is transverse, i.e. in a plane perpendicular to the bolt axis. In shear joints of this type, it is desirable from the standpoint of joint mechanics to assure that a minimum torque value has been applied in addition to assuring that the bolt stress is above a predetermined value. Accordingly, a typical fastener in a shear joint might be tightened to 90% proof and 40 foot pounds. Calculations are conducted in accordance with the previous disclosure to terminate tightening at 90% proof. If the estimated or actual torque value at the termination of threading advance or one or two $\Delta\alpha$ increments prior thereto is less than the minimum predetermined torque, the tool is restarted until the minimum torque value is attained. Accordingly, if the final estimated torque $T_D$ or the final peak torque $T_{final}$ is equal to or greater than the minimum torque $T_{min}$, tightening is terminated normally. On the other hand, if the estimated final torque $T_D$ or the peak torque $T_{final}$ is less than $T_{min}$, a value of shut off torque $T_{sh}$ is calculated as $$T_{sh} = T_{min} - ud\alpha. \tag{98}$$

The tool is accordingly restarted and the air supply valve is closed at a location where the running torque value is $T_{sh}$. The tool overruns for an angle increment $d\alpha$ so that the final attained torque value is $T_{min}$.

Joint With Multiple Fasteners

When tightening seriatim a multiplicity of fasteners comprising part of a single joint using a conventional technique, it is well known that the first tightened fasteners will lost at least some tension by the time the last fasteners are tightened. This is, of course, related to joint relaxation and alignment of the joint parts. In accordance with this invention, one powered instructable tool as disclosed more fully hereinafter may be used for each fastener and used in the following manner.

The tools are started simultaneously. When all of the tools have stopped at the mid-point 62, all the tools are restarted simultaneously to accomplish the final advance. In this manner, the alignment of all the fasteners and all joint relaxation occurs at the mid-point stop 62. Each tool would then compensate for any relaxation that may have occurred adjacent the fastener coupled thereto. It will be apparent that the control mechanism for the tools would be interconnected electronically in a fashion that will be apparent to those skilled in the art following the more complete description of the tool hereinafter.

EQUIPMENT

Figure 10:
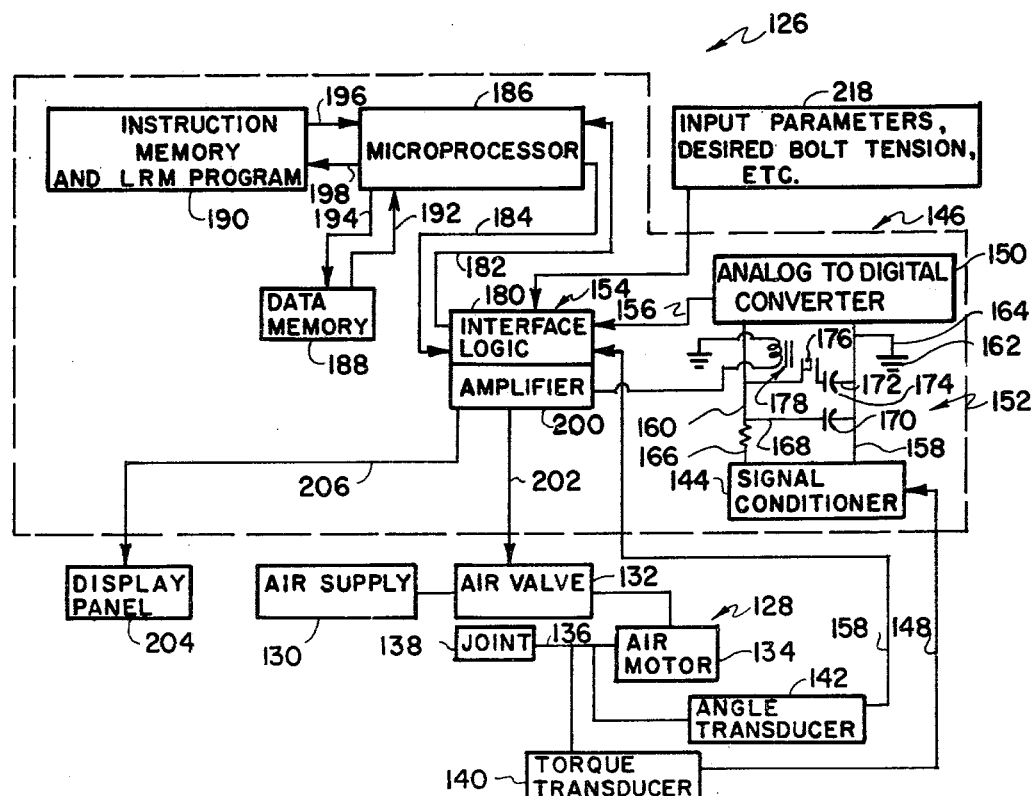
FIG. 10 is a schematic view of the mechanism of this invention.

Referring to FIG. 10, there is illustrated a schematic showing of a mechanism 126 for performing the previously described technique. The mechanism 126 includes an air tool 128 connected to an air supply 130 and comprising an air valve 132, an air motor 134 having an output 136 coupled to the fastener pair comprising part of the joint 138, a torque transducer 140 and an angle transducer 142. The torque transducer 140 is connected to a signal conditioner 144 of a data processing unit 146 by a suitable electrical lead 148.

The signal conditioner 144 is designed to receive electrical signals from the transducer 140 and modify the voltage and/or amperage thereof into a form acceptable by an analog-to-digital converter 150 through a suitable connecting circuit 152 described more fully hereinafter. The converter 150 changes the analog signal received from the conditioner 144 into digital form for delivery to an interface logic unit 154 through a suitable connection 156. The angle transducer 142 is connected to the interface logic unit 154 by a lead 158.

The connecting circuit 152 provides the torque signal filtering function discussed. To this end, the circuit 152 includes a pair of parallel leads 158, 160 connecting the signal conditioner 144 to the analog to digital converter 150. The lead 158 is connected to a ground 162 by a lead 164. The lead 160 includes a resistor 166. Extending between the leads 158, 160 is a lead 168 having a first capacitor 170 therein. A second lead 172 also extends between the leads 158, 160 and has therein a second capacitor 174 as well as a switch mechanism 176 of a relay 178. The relay 178 may be of any suitable type and is designed, when energized, to close the switch mechanism 176 to place the second capacitor 174 in parallel with the first capacitor 170 in the connecting circuit 152.

In operation with the relay 178 unenergized, the resistance 166 and the first capacitor 170 act as an R-C filter to remove very high frequency noise from the conditioned torque signal passing across the leads 158, 160. When the relay 178 is energized, the second capacitor 174 is placed in parallel with the first capacitor 170. Together, the resistor 166 and the capacitors 170, 174 act to filter the analog torque signal appearing in the leads 158, 160. As mentioned, the circuit 152 is employed with tightening tools which produce a substantial amount of internal chatter. In such tools, the relay 178 is energized during the initial portion of the tightening cycle, usually up to and including the mid-point stop 62. Accordingly, the resistance-capacitance network provided by the resistor 166 and the capacitors 170, 174 act to substantially filter the analog torque signal appearing on the leads 158, 160. At the mid-point stop 62, the energizing signal delivered to the relay 178 is terminated so that the switch mechanism 174 opens to remove the capacitor 176 from the connecting circuit 152.

It will be appreciated that the relative sizes of the resistor 166, first capacitor 170 and second capacitor 174 control the degree of filtering actually accomplished. Although the design of the filtering network is subject to design selections, the following sizings have proved acceptable: the resistance of the resistor 166 is 2000 ohms, the capacitance of the first capacitor 170 is 0.5 microfarads, and the capacitance of the second capacitor 174 is 5 microfarads.

The interface logic unit 154 comprises an interface logic section 180 designed to handle information and is connected through suitable connections 182, 184 to a microprocessor unit 186 which is in turn connected to a data memory unit 188 and an instruction memory and program unit 190 through suitable connections 192, 194, 196, 198. The interface logic section 180 is also designed to receive input parameters such as $T_{os}$, $FR_1$, r, $F_D$ and the like.

The interface logic unit 154 also comprises an amplifier section 200 controlling a solenoid (not shown) in the air valve 132 through a suitable electrical connection 202. The amplifier section 200 also controls a display panel 204 having suitable signal lights through an electrical connection 206 as will be more fully explained hereinafter. The relay 178 is similar energized through a connection 208 from the amplifier section 200.

The air tool 128 may be of any type desired such as a Rockwell model 63W which has been modified to reduce the amount of overrun or such as is shown in copending application Ser. No. 766,429. It has been surprising to learn that the bulk of the tool overrun occurs between the time the shut off command is given through the electrical connection 202 and the time that high pressure air downstream of the valve 132 is exhausted through the motor 134 while the amount of overrun attributable to inertia of the air tool 128 is rather insignificant at high running torque values because tool speed is rather slow.

Figure 11:
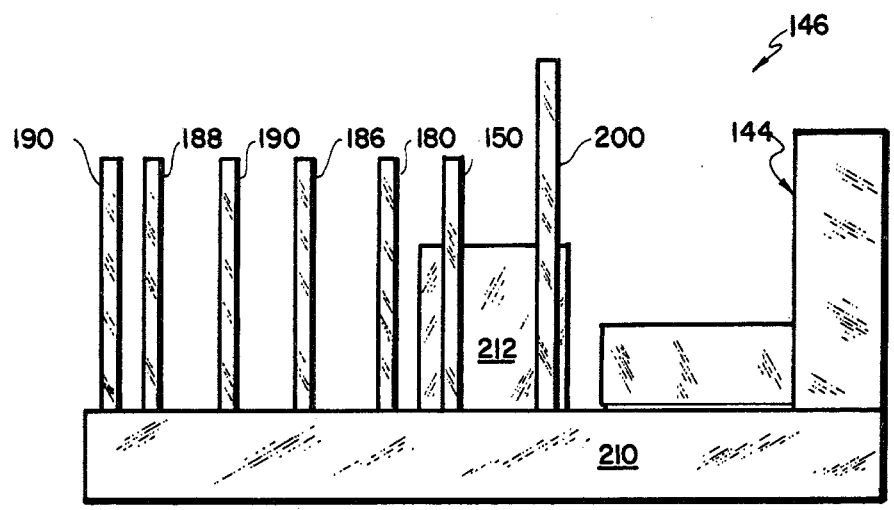
FIG. 11 is a side view of a component of the mechanism of FIG. 10.

The data processor 146 is shown in greater detail in FIG. 11 and conveniently comprises a Rockwell microprocessor model PPS8. For a more complete description of the data processor 146, attention is directed to publications of Rockwell International pertaining thereto.

The data processor 146 comprises a chassis 210 having a power source 212 mounted thereon along with the signal conditioner 144, the instruction memory and program unit 190, the data memory unit 188, the microprocessor unit 186, the interface logic section 180, the converter 150 and the logic interface amplifier section 200. The signal conditioner 144, the interface logic section 180, the microprocessor unit 186, and the data memory unit 188 are not modified in order to equip the data processor 146 to handle the calculations heretofore described.

The instruction memory and program unit 190 is physically a part of the data processor 146 and is physically modified to the extent that a suitable program has been placed therein. The initial machine language program developed during the investigation of this invention contains over 7,000 instructions and, on conventional computer output paper, is approximately 150 pages long. In the interests of brevity, economy and clarity, a FORTRAN version of the machine language program is included with the parent application U.S. Ser. No. 912,151, filed June 2, 1978, and is hereby incorporated by reference. This FORTRAN program will be understandable to any programmer skilled in the art and may be reconverted into a machine language program either manually or by the use of a standard language translation program. There are some input-output functions performed in the microprocessor 186 which cannot be converted into FORTRAN. These functions are point out in subroutines with comments describing what events should occur and be controlled by the subroutines. A second generation program has been developed. Rather than unduly lengthen this specification the program instructions—found in the aforementioned U.S. patent application, Ser. No. 912,151, filed June 2, 1978—are hereby incorporated by reference. Those instructions will enable anyone of ordinary programming skills to prepare a program in any suitable language for any suitable data processor.

Figure 12A:
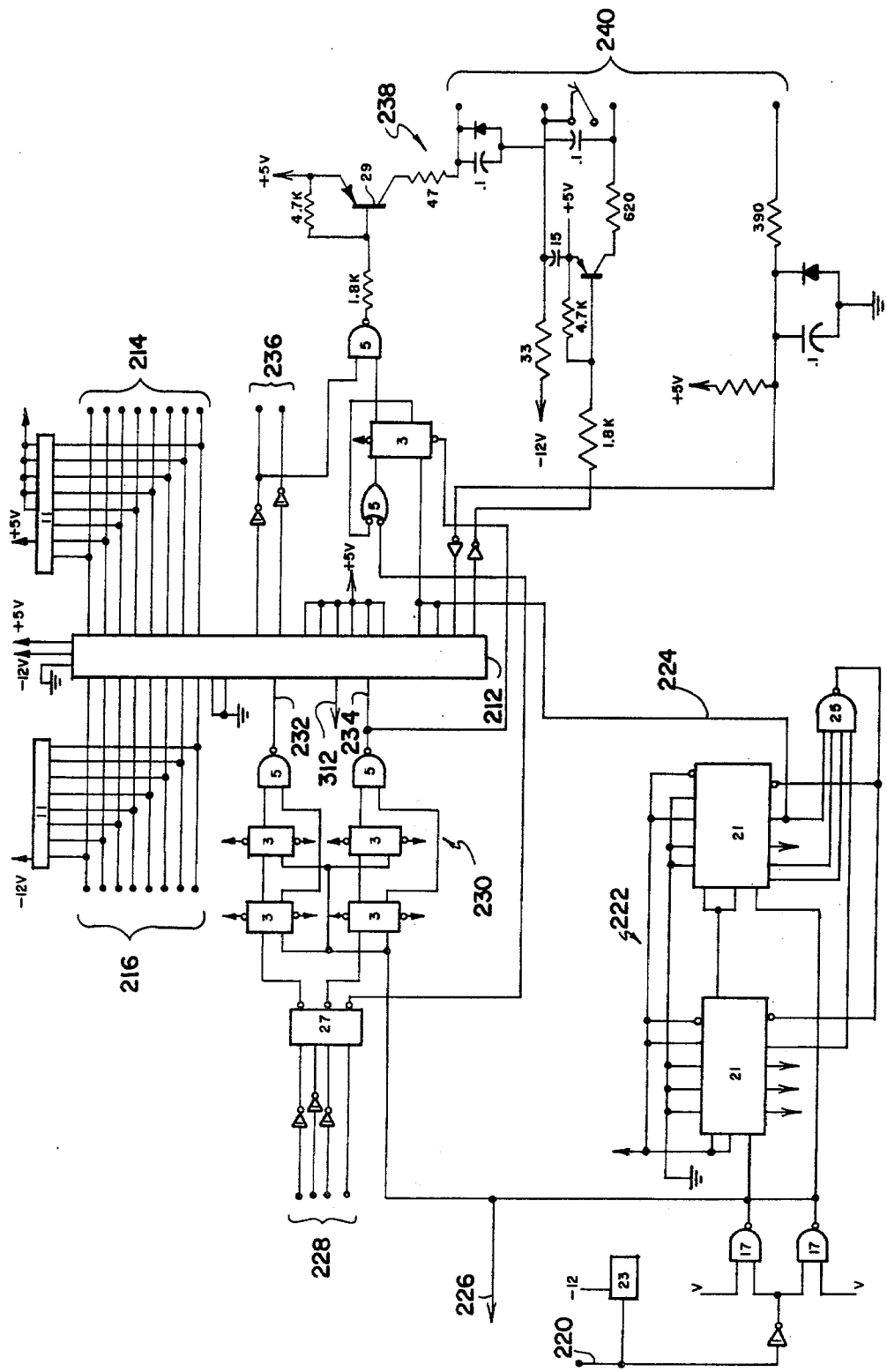
FIGS. 12A and 12B are circuit diagrams of another component of the device of FIG. 10.
Figure 12B:
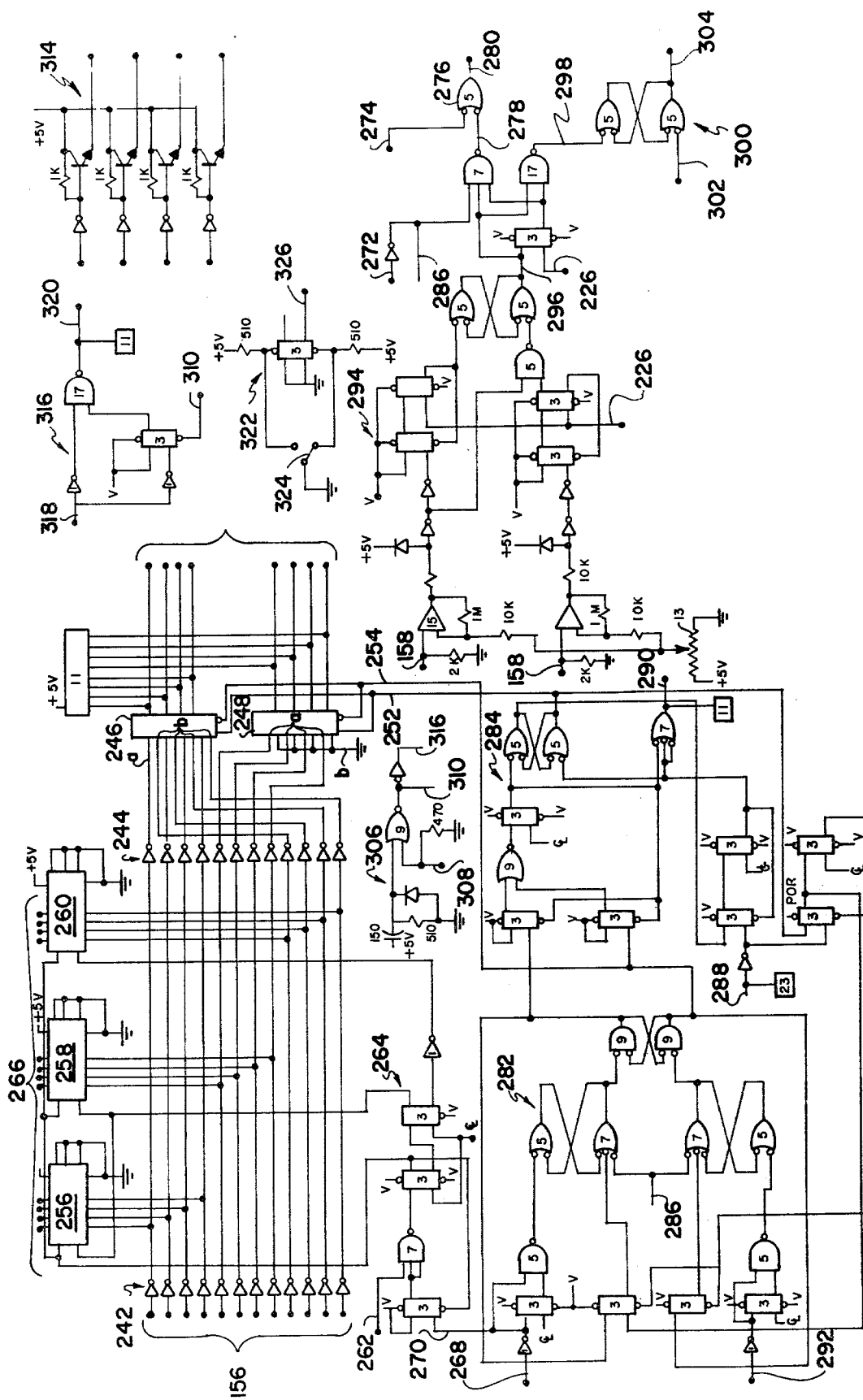

The interface logic and amplifier circuits 154, 200, illustrated schematically in FIGS. 12A and 12B, serve to provide interfacing of data and control signals between the microprocessor unit 186, a conventional teletype console (not shown), the torque and angle transducers 140, 142, and the air valve 132 controlling tool operation.

Interfacing between the teletype console and the microprocessor 186 is necessitated by the fact that the console receives and transmits data in a serial format while the microprocessor 186 receives and transmits in a parallel format. The interface logic and amplifier circuits 154, 200 include a universal asynchronous receiver transmitter circuit 212 which receives input data, such as a desired tension value $F_D$, from the teletype console over the lines 214 in a serial or one bit at a time format, temporarily stores the data, and then transmits the data in parallel format over the lines 216 to the microprocessor 186. Thus a teletype console or other suitable means may provide an input 218 (FIG. 10) for variable empirical parameters, desired bolt tension and the like. Likewise, data from the microprocessor 186, which is to be printed out by the teletype console, is converted from the parallel format in which it is received from the microprocessor 186 over the lines 216 into the serial format for reception by the teletype console.

Timing pulses for the control of the universal asynchronous receiver transmitter 212 as well as other components of the interface logic and amplifier circuits are provided from the microprocessor 186 over line 220, the pulse train being supplied to a conventional divider circuit 222 to produce a timing signal on the line 224 which is a pulse train of lesser but proportional rate to that supplied by the processor 186. Timing pulses are also provided to other components of the interface logic and amplifier circuit over the line 226. The microprocessor 186 also provides signals over the lines 228 which signals are generated in response to the program to control the transmission of data to and from the microprocessor 186. Thus, for example, when the microprocessor 186 is in condition to input data, such as the final desired torque value $T_D$, a signal is transmitted from the microprocessor 186 over the lines 228 to a gating circuit 230 to furnish control inputs at 232, 234 to the universal asynchronous receiver transmitter 212. Control and status indication signals for the teletype console are also provided over the lines 236 and, via signal conditioner circuits 238, over the lines 240.

FIG. 12B schematically illustrates that portion of the circuit which provides interfacing between the microprocessor 186, the torque and angle transducers 140, 142 and the air valve 132. Torque data from the torque transducer 140 (FIG. 10) is converted by the analog to digital converter 150 into twelve digit binary signals transmitted on the line 156. The particular microprocessor employed is, however, only capable of receiving an eight digit input. In order to permit transmission of torque data to the processor, a multiplexing arrangement is provided. Thus, the twelve digit output of the analog to digital converter 150 is supplied, through logic level buffers 242, 244 to a pair of steering gates 246, 248, the first four digits being supplied to the first inputs a of the gate 246 while the second four digits are supplied to the corresponding first inpts a of the gate 238. The final four digits are supplied to the second inputs b of the gate 246. The corresponding second inputs b of the gate 248 are connected to ground, supplying a constant zero input. The eight line output 250 of the steering gates 246, 248 provides the torque data input to the microprocessor 186. The gates 246, 248 are controlled by signals on the lines 252, 254 to first pass the a input signals, i.e. the first eight bits of the torque signal, to the output lines 250 followed by the b input signals, i.e. the final four bits and four zeros. In addition to being supplied to the steering gats 246, 248, the torque data transmitted on lines 156 is also temporarily stored in the registers 256, 258, 260. These registers normally store the current torque value received from the analog to digital converter 150. A hold signal furnished by the microprocessor 186 over the line 262 actuates a latching circuit 264 to temporarily freeze the registers 256, 258, 260 permitting the torque values stored therein to be read over the lines 266. This arrangement permits reading of the torque data into the microprocessor 186 while updated torque data is being supplied from the analog to digital converter 150 without the danger of inadvertently reading into storage a data value which is a mixture of old and updated values.

The analog to digital converter 150 supplies an end of conversion signal over line 268 which signal is supplied to the latching circuit 264 over the line 270 to reset the circuit 264 when transmission of a torque value has ended permitting updating of the registers 256, 258, 260. It should be noted that the analog to digital converter 150 is under the control of the microprocessor 186. Thus the microprocessor 186 provides an enable signal over the line 272 and a convert signal over the line 274 to a gate 276 which also receives, over a line 278, a tool rotation indicating signal, the origin of which will be described below. It will be understood that the enable and convert signals on lines 272, 274 are generated in response to the program controlling the microprocessor 186. The output of the gate 276 provides a start conversion signal to the analog to digital converter 150 over the line 280.

As mentioned previously, the steering gates 246, 248 receive control signals over the lines 252, 254. These control signals are generated by a pair of gating circuits 282, 284. The gating circuit 282 is responsive to the end of conversion signal from the analog to digital converter 150 on the line 268 and an enable signal on the line 286 which signal is derived from the enable signal supplied by the microprocessor 186 over the line 272. The gating circit 282 provides an input to the gating circuit 284 which also receives a signal over the line 288 from the microprocessor 186 in the form of a response back signal indicating that the previous data has been loaded into the microprocessor memory. In addition to controlling the steering gates 246, 248, the gating circuit 284 furnishes a data ready signal on the line 290 to the microprocessor 186. A further input 292 is provided for the logic gating circuit 282. The function of this input is to supply an event market to memory.

The circuitry of FIG. 12B also provides interfacing between the angle transducer 142 and the microprocessor 186. The output signals of the angle transducer 142, in the form of sine and cosine signals are supplied over the line 158 to a converting circuit 294 which, in response to the transducer signals, generates an output pulse for each degree of rotation of the tool. This pulse signal on the line 296 provides the tool rotation indicating signal on the line 278 and also provides an input to a gating circuit over a line 298. The gating circuit 300 also receives an input signal from the microprocessor 186 over the line 302. This latter signal is present during the tool on period and goes off simultaneously with the tool off signal. The output 304 of the gating circuit 300 provides an input to the microprocessor 186 in the form of a pulse train with one pulse for each degree of tool rotation. The portion of this signal occurring after the input signal on the line 302 has been removed in a measure of the degree of tool overrun.

Also included in the interface logic and amplifier circuits is a reset circuit 306 connected at 308 to a reset switch and providing output signals on lines 310, 312 which serve to reset various of the circuit components when the system is turned on. Signal conditioner circuits are also provided, with the circuits 314 providing interfacing between the microprocessor 186 and external controls for reset, gain, internal calibration and external calibration while the circuit 316 serves to interface the tool on signal from the microprocessor 186 over the line 318 with a solid state relay controlling the air valve 132, the output signal being provided over the line 320. A further circuit 322 is connected to a single pole double throw external switch 324 serving as an emergency or panic switch. The output 326 of the circuit 322 supplies an interrupt signal to the microprocessor 186.

The components illustrated in FIGS. 12A and 12B are more completely identified in Table I, below:

TABLE I

| Identification on Standard Parts No. | Number |
| --- | --- |
| SN74LS04 | 1 |
| SN7474L | 3 |
| SN7400L | 5 |
| SN741QL | 7 |
| SN7402L | 9 |
| Resistor Pack, 4.7Kohms | 11 |
| Potentiometer, 1Kohms | 13 |
| 72747, Texas Instruments | 15 |
| Diode, 1N914 | unmarked |
| SN7404L, inverter | unmarked |
| SN7437L | 17 |
| Transistor | unmarked |
| SN74157L | 246, 248 |
| SN7496L | 256, 258, 260 |
| SN74161L | 21 |
| Resistor Pack, 15K ohm | 23 |
| SN7420L | 25 |
| SN7442L | 27 |
| TR1602 | 212 |
| Transistor 2N2905 | 29 |
| Resistors 33, 620 have ¼ watt rating | unmarked |

The number adjacent each resistor is the resistance in ohms. All resistors except 33, 620 have ¼ watt ratings. The number adjacent each capacitor is the capacitor in microfarads. The symbol "v" is used to designate that the particular lead is connected to a 5 volt buss through a resistor, e.g. of 1000 ohm capacity, to prevent damage to the component. The symbol "POR" is used to designate "power on reset" which means that power stays on about ½ second.

Figure 13:
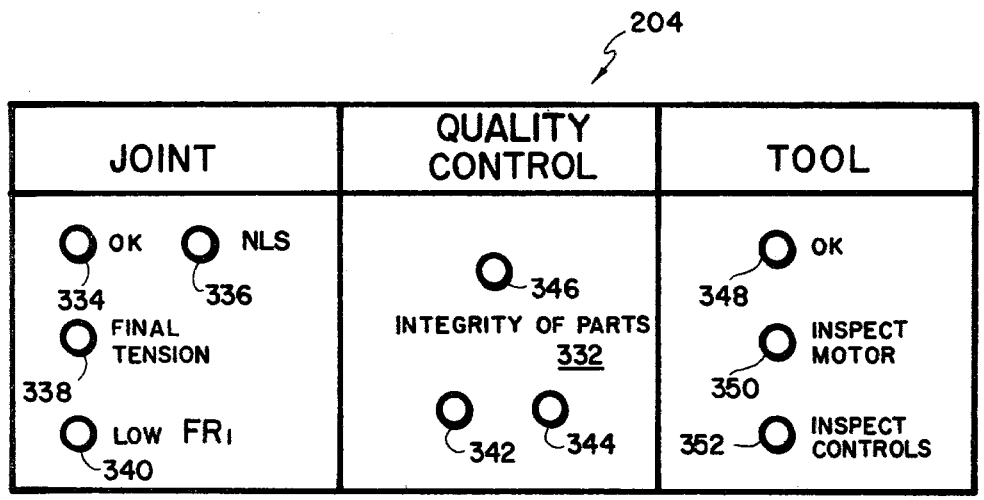
FIG. 13 is a front view of a typical operator's console.

Although the computer program and the circuitry of the interface amplifier section 200, previously described, are designed to activate a conventional teletype console in order to enter different values for the empirically determined parameters and to obtain a printed readout of certain calculated values such as the tension at the mid-point stop 62, it is apparent that the details thereof can be adapted to manipulate a display panel 204 as shown in FIG. 13. The display panel 204 is preferably located within view of the tool operator and comprises a base section 332 supported in any suitable fashion having a first group of signal lights 334, 336, 338, 340 indicating features of the joint 138. The signal light 334 indicates that the final desired tension value $F_D$ has been reached or that the final calculated tension value $F_{final}$ is within an acceptable range. The signal light 336 indicates that the joint has experienced non-linear strain. The signal light 338 indicates that the final calculated tension value $F_{final}$ is in an unacceptable range. With the lights 334, 336 lit, the deduction is that non-linear strain has occurred but that $F_{final}$ is acceptable. With the lights 336, 338 lit, the deduction is that non-linear strain has occurred but that $F_{final}$ is not acceptable. The light 340 is energized when the fastener exhibits a low tension rate as pointed out by the ratio of $TR_a/TR_b$.

The display 204 also provides another group of lights 342, 344, 346 indicating quality control features. The light 342 is normally energized when the frequency of non-linear strain detection is minimal while the light 344 is energized when the frequency of non-linear strain detection is too high as pointed out in equation (79). The light 346 is energized when the final calculated tension $F_{final}$ differs significantly from the final desired tension value $F_D$ as pointed out by equation (90). It will be evident that additional lights may be provided to signal that other quality control procedures have indicated that the joint is subnormal. In the alternative, a single light may be used to single joint abnormality and the microprocessor arranged to deliver a signal to another computer for record keeping purposes.

The display 204 also comprises a third group of lights 348, 350, 352 indicating tool operating features. The light 348 indicates that the tool is functioning normally. The light 350 is energized when the ratio $\delta\alpha/\delta\alpha_p$ is too small or when the frequency of low ratio values becomes significant. Similarly when the ratio of $\delta\alpha/\delta\alpha_p$ is too large, or when the frequency of high ratio values becomes significant, the light 352 is energized.

EXAMPLES

A typical fastener system for use with this invention may comprise 5/16", 24 threads/inch, SAE grade 8 nuts and bolts. With this fastener pair and the modified Rockwell 63W air tool, the following values were found for the empirically determined parameters:

| | | |
|---|---|---|
| $FR_1 = 47$ lb/degree | $n = 14$ | $r = 1.12$ |
| $T_o = 54$ ft-lb | $F_M = 2900$ lb | $a = 11.6$ degrees/ft-lb |
| $F_L = 1000$ lb | $c = 52.3$ degrees | $T_1 = 5$ ft-lb |
| $\alpha_d = 68$ degrees | $N_k = 0.80$ | $R = 0.93$ |
| $T_{os} = .4$ ft-lb | $\alpha_y = 12$ degrees | $K_o = .21$ ft-lb/degree |
| $\alpha_{or} = 20$ degrees | $\alpha_K = 9$ degrees | $\Delta\alpha = 3$ degrees |

Using these parameters and the described fasteners, which have a grip length of 2.44", and having a cadmium dichromate coating, the following data was developed using part of the technique here disclosed. The stiffness of the load washer used to measure tension directly was a $5 \times 10^6$ lb/in and the clamped pieces were hardened steel. In running the tests reported in the following table, the angle option was used and execution was within $+2$ to $-1$ degrees, which corresponds to $+104$ to $-52$ pounds tension. The overall instrumentation repeatability and linearity, including the tension probe and the torque transducer, is estimated at 4%. The tension value reported in the second column was recorded approximately 15 seconds after the tool stopped. This is believed to involve a relaxation in the joint amounting to 1-2% of the recorded tension value.

A statistical analysis of the data gathered on the twenty fasteners reported in Table II shows that the partial technique of this invention acts to control tension to within $\pm 11.1\%$ of the desired value in 99 out of 100 cases, or within 2.58 standard deviations. It should be thoroughly understood that the above data was taken with a program which does not include a number of features disclosed herein, including (1) the use of a second calculation for TR and $\alpha_{origin}$; (2) the provision of yield detection and shut off in response thereto; (3) the use of a curvature check of torque rate in the region where TR is calculated in order to identify and reject low tension rate fasteners; (4) the adjustment of the final tightening parameter for the effects of prevailing torque; and (5) the use of the quality control procedures disclosed herein which were not disclosed in copending application Ser. No. 712,554. The effect of these additions to the program is, of course, somewhat speculative. It is believed, however, that the inclusion thereof will reduce scatter still further.

TABLE II

| Run No. | LRM Set for 6,200 $F_{final}$, lb | $T_{final}$, ft-lb | Final Angle From 5 ft-lb $\alpha_{T1}$, deg | Exact $\alpha_{T1}$ for 6,200 lb Tension | Exact Torque for 6,200 lb Tension | Condition |
|---|---|---|---|---|---|---|
| 1 | 6355 | 28.91 | 108 | 105 | 28.22 | As received |
| 2 | 6179 | 32.33 | 109 | 109 | 32.44 | As received |
| 3 | 6517 | 34.00 | 107 | 101 | 32.18 | As received |
| 4 | 6356 | 27.61 | 107 | 104 | 26.93 | As received |
| 5 | 6274 | 28.23 | 105 | 104 | 27.90 | As received |
| 6 | 6147 | 30.65 | 108 | 109 | 30.91 | As received |
| 7 | 6221 | 28.91 | 106 | 106 | 28.81 | As received |
| 8 | 6205 | 30.77 | 108 | 108 | 30.75 | As received |
| 9 | 6151 | 28.85 | 102 | 103 | 29.08 | As received |
| 10 | 6742 | 31.02 | 109 | 99 | 28.37 | As received |
| 11 | 6377 | 16.38 | 90 | 87 | 15.93 | Lubricated with SAE 10 oil |
| 12 | 6706 | 18.05 | 96 | 87 | 17.18 | Lubricated with SAE 10 oil |
| 13 | 6407 | 16.81 | 100 | 96 | 16.27 | Lubricated with SAE 10 oil |

TABLE II-continued

| Run No. | LRM Set for 6,200 $F_{final}$, lb | $T_{final}$, ft-lb | Final Angle From 5 ft-lb $\alpha_{T1}$, deg | Exact $\alpha_{T1}$ for 6,200 lb Tension | Exact Torque for 6,200 lb Tension | Condition |
|---|---|---|---|---|---|---|
| 14 | 6103 | 12.16 | 70 | 72 | 12.35 | Lubricated with SAE 10 oil |
| 15 | 6045 | 15.14 | 88 | 91 | 15.53 | Lubricated with SAE 10 oil |
| 16 | 6030 | 16.00 | 87 | 90 | 16.45 | Lubricated with SAE 10 oil |
| 17 | 5634 | 14.64 | 84 | 95 | 15.59 | Lubricated with SAE 10 oil |
| 18 | 5891 | 15.20 | 83 | 89 | 15.73 | Lubricated with SAE 10 oil |
| 19 | 6618 | 17.68 | 91 | 83 | 16.88 | Lubricated with SAE 10 oil |
| 20 | 6381 | 16.56 | 91 | 88 | 16.09 | Lubricated with SAE 10 oil |
| Average | 6267 | 21.31 | 97.5 | 96.3 | 22.68 | |
| Observed deviation from Avg. % | +7.8 −10.1 | +59.5 −42.9 | +11.9 −28.2 | +13.2 −25.2 | +43.0 −45.5 | |
| One std. deviation, % of Avg. | 4.3 | — | — | 10.6 8.4 on tension | 31.9 | |

With the same joint and tool, the use of a torque control method would have to produce an average final torque of 22.68 ft-lbs to achieve an average final tension value of 6267 pounds. The observed deviations from average is +43.0 to −45.5%. Thus the torque control method would have produced a tension scatter of ±82.3% of the desired value in 99 out of 100 cases, assuming that the bolts would have been capable of accepting any tension. In reality, 10.4% of the bolts would have ruptured, producing no tension at the termination of tightening. Another 14.7% of the bolts would terminate in the plastic zone, i.e. past the yield point.

With the same joint and tool, the use of a turn-of-the-nut method would have to advance the nut 96.3° from a threshold torque of 5 ft-lbs to achieve a final tension value of 6267 pounds. The observed deviation is +13.2 to −25.2%. Thus, a turn-of-the-nut method would have produced a tension scatter of ±21.7% of the desired value in 99 out of 100 cases. It is interesting to note that the selection of 6200 pounds for a bolt having an elastic limit of 6950 pounds appears to be optimum because only about 0.6% of these bolts would end up in the plastic zone.

In another test on the same joint, the selected final tension $F_D$ was 90% nominal proof or 6300 pounds. In this test, such refinements as a second pass for the determination of TR and $\alpha_{origin}$ was used, a non-linear strain procedure and the remaining quality control procedures were available. To obtain independent tension values, a load washer was incorporated into the joint. The load washer was carefully calibrated for mean setting and reading scatters were measured under the same load condition existing in the joint. Table III shows the experimental results. The data reported excludes an abnormal joints indicated as unacceptable by the system. Accordingly, any defective joint that would have passed a torque strategy or a turn-of-the-nut strategy is excluded even though conventional systems would not have rejected these fasteners. Thus, the reported data on torque control and turn-of-the-nut strategies are better than would be expected in practice. The reported results are corrected for load washer scatter of approximately 1.8%, one standard deviation.

TABLE III

| | Tension and Torque Scatter One Standard Deviation | | |
|---|---|---|---|
| | Tension Scatter, % | | Torque Scatter |
| Lube Condition | LRM | T-O-T-N | at 6300 lbs, % |
| dry | 2.2 | 6.4 | 18.5 |
| oiled | 2.4 | 5.0 | 13.8 |
| mixed | 2.6 | 8.2 | 29.9 |

Although the data of Table III appears to be substantially different than the data of Table II, the major difference lies in the adjustment in Table III of the load washer error of 1.8%, one standard deviation, whereas this adjustment has not been made in Table II.

Figure 14:
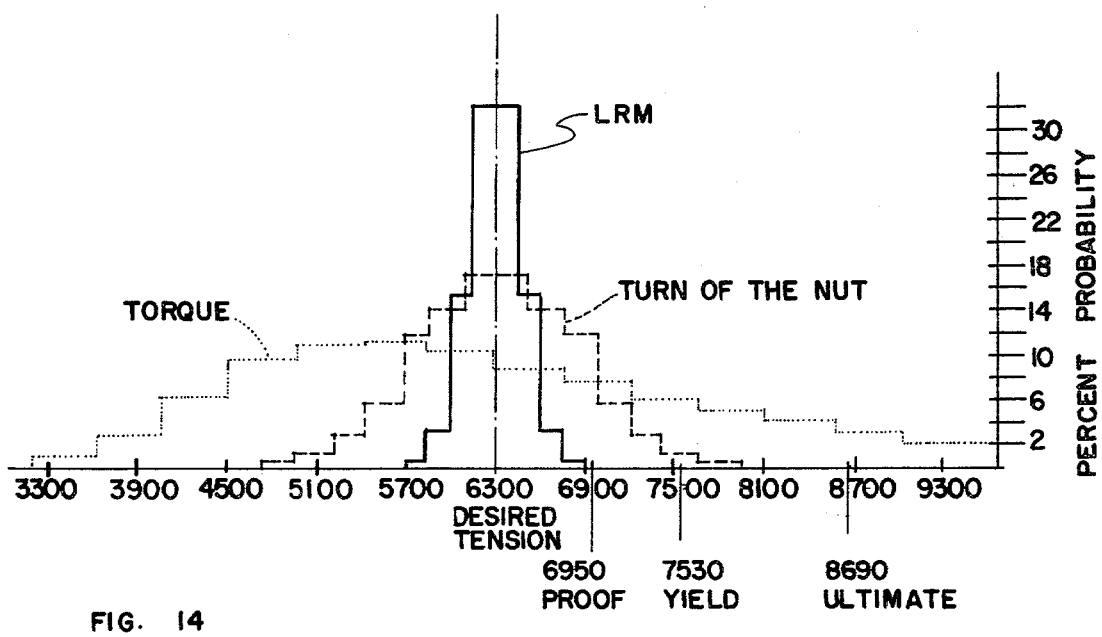
FIG. 14 is a graph illustrating the relative effectiveness of this invention compared to prior art techniques.

It has been learned that torque scatter at constant tension is quite different from tension scatter at constant torque. Whereas torque scatter has a normal distribution, tension scatter at constant torque has a shifted or unsymmetrical distribution. The mixed lubrication condition, which involves the largest variation in friction, has been chosen to show the expectations in achieving tension control with various strategies. Referring to FIG. 14, the probability distributions in finite tension bands are illustrated. It will be apparent that the technique of this invention is substantially superior to the torque control and turn-of-the-nut strategies of the prior art.

ANALOG EMBODIMENT

Figure 15:
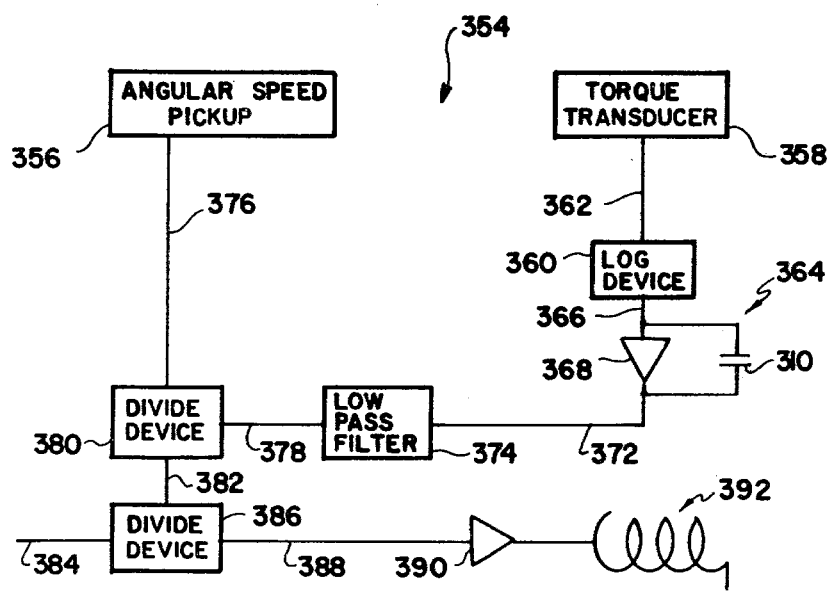
FIG. 15 is a block diagram illustrating another mechanism of this invention.

Referring to FIG. 15, there is illustrated another device 354 for implementing the technique of this invention. The basis of this approach is equation (7) where the value of $dF/d\alpha$ indicates the tension rate. Rewriting equation (7), $$\frac{d}{d\alpha} \log T = \frac{dF/d\alpha}{F} . \tag{99}$$

If $d/(d\alpha) \log T$ can in some fashion be determined, F in equation (99) can become the final desired tension value $F_D$ or the tension value $F_{so}$ at the point of shut off command while $dF/d\alpha$ is an empirically determined tension rate $FR_3$ which is an appropriate average of $FR_1$ and $FR_2$ over the angle interval in question. It will be apparent that $$\frac{d}{d\alpha} \log T = \frac{\frac{d}{dt} \log T}{\frac{d\alpha}{dt}}. \tag{100}$$

As suggested in FIG. 15, the analog device 354 includes an angular speed pickup 356 of any suitable type, such as a tachometer, for continuously sensing a value for $d\alpha/dt$, which is the speed the fastener is being tightened.

A torque transducer 358 continuously senses the value of running torque T. The transducer 358 may be of the same type as the transducer 140. A logarithmic amplifier 360, such as is available from Analog Devices, Inc., Norwood, Masachusetts, under the designation of Logarithmic Amplifier, Model 755, is connected to the torque transducer 358 by a suitable connection 362. The logarithmic amplifier 360 continuously converts the sensed value of running torque T into a continuous signal representative of log T.

A time differentiating device 364 is connected to the logarithmic amplifier 360 by a suitable lead 366 and continuously differentiates the signal from the logarithmic amplifier with respect to time in order to obtain the differential of the logarithm of running torque $d/(dt) \log T$. The time differentiating device 364 may be of any suitable type, such as an operational amplifier 368 in parallel with a capacitor 370. A suitable operational amplifier is available from Analog Devices, Inc., Norwood, Massachusetts, under the designation Operational Amplifier, Model 741.

The signal from the time differentiating device 364 is delivered through a lead 372 to a low pass filter 374 which acts to smooth out the signal from the time differentiating device 364 thereby removing some of the noise inherent in the torque signal from the transducer 358.

The angular speed pickup 356 and the low pass filter 374 are connected by suitable leads 376, 378 to an analog divide device 380 such as may be obtained from Analog Devices, Inc., Norwood, Massachusetts under the designation Divide Module 463B. The leads 376, 378 are connected to the divide device to produce an output signal along a lead 382 consisting of the ratio $$\frac{\frac{d}{dt} \log T}{d\alpha/dt}.$$

As indicated in equation (100), this signal is representative of $d/(d\alpha) \log T$. When the value of $$\frac{d}{d\alpha} \log T \leq \frac{FR_3}{F_{so}}, \text{ when } T \geq T_1 \tag{101}$$

where $F_{so}$ is the tension value in the bolt at the time of shut off, and $T_1$ is an early predetermined torque value, e.g. about 20-30% of the average final torque, the tool is commanded to shut off. It will be evident that the threshold may be measured in terms of angle, e.g. where $\alpha > \alpha_1$, rather than torque.

Because the tool will overrun after shut off, the value of $F_{so}$ is selected so that average tool overrun advances the fasteners to the final desired tension value $F_D$. The average tool overrun may be determined empirically or from $$\Delta F_{so} = \left(\frac{d\alpha}{dt}\right)_{so} (\Delta t) FR_3 \tag{102}$$

where $$\left(\frac{d\alpha}{dt}\right)_{so}$$

is the average speed of the tool at thus off, $\Delta F_{so}$ is the average additional tension due to overrun, and $\Delta t$ is the time delay between the giving of the shut off command and the closing of the air value. Thus, $$F_{so} = F_D - \Delta F_{so}. \tag{103}$$

Because $F_{so}$ and $FR_3$ are assumed to be a constant, the ratio of $FR_3/F_{so}$ is obviously constant. Thus, a constant signal representative of $FR_3/F_{so}$ is placed on a lead 384. The leads 382, 384 are connected to another divide device 386. When the output signal from the divide device 386 on a lead 388 becomes unity, an amplifier 390 is triggered to energize a solenoid catch 392 to allow the solenoid spring (not shown) to close the air valve.

Although the analog device 354 of FIG. 15 is not believed to have the accuracy of the digital device 126, it is apparent that it has the advantage of simplicity, both physical and operational. The analog device 354 operates closer to the theoretical basis of the invention and contains fewer assumptions and simplifications. Some of the disadvantages of a simple analog device, such as the inability to vary the overrun prediction and the noise reduction in the filter 374, are capable of being surmounted by more sophisticated analog techniques as will be apparent to those skilled in the art.

As heretofore disclosed, the analog device 354 is designed to deliver a running torque signal T which is converted into a signal representative of log T which is then differentiated with respect to time to give $d/(dt) \log T$. As explained previously, it is desirable to adjust the running torque value T by deducting the values of offset torque $T_{os}$ and prevailing torque $T_{pv}$. It will be appreciated that this can be readily accomplished by suitable analog devices placed in the connection 362 between the torque transducer 358 and the log device 360.

As will be apparent to those skilled in the art, the technique of this invention can be used to monitor other tightening strategies thereby determining the accuracy thereof in tightening fasteners to a final desired stress value. This may readily be accomplished by modifying the amplifier section 200 in order not to manipulate the air valve solenoid in response to the tightening parameter.

Although the invention has been described in its preferred forms with a certain degree of particularity, it is understood that the disclosure of the preferred embodiments has been made only by way of example and numerous changes in the details of construction, combination and arrangements of parts, and mode of operation may be restored to without departing from the spirit and scope of the of the invention as hereinafter claimed. It is intended that the patent shall cover, by suitable expression in the appended claims, whatever features of patentable novelty exist in the invention disclosed.

I claim:

1. Apparatus for tightening a threaded fastener at least partially into a region of increasing fastener stress where the torque curve exhibited by the fastener is expected to be linear, comprising
   means for applying torque to the threaded fastener;
   means for stopping the torque applying means in the region of fastener stress; and
   means operative after the termination of tigthening and prior to resumption of operation of the torque applying means for monitoring the fastener including
       means for checking the curvature of the torque curve.

2. The apparatus of claim 1 wherein the terminating means comprises means for terminating tightening in response to a tightening parameter other than non-linear strain.

3. The apparatus of claim 1 wherein the checking means includes means for determining whether the torque rate in a first area of the region is substantially the same as in a second area of the region.

4. The apparatus of claim 3 further comprising means for generating a signal when the torque rate in the first area differs substantially from the torque rate in the second area.

5. The apparatus of claim 3 wherein the determining means includes means for directly determining whether the torque rate in the first area is substantially the same as in the second area.

6. The apparatus of claim 5 wherein the direct determining means includes
   means for determining the torque rate in the first and second areas; and
   means for comparing the torque rates from the first and second areas.

7. The apparatus of claim 3 wherein the determining means includes means for indirectly determining whether the torque rate in the first area is substantially the same as in the second area.

8. The apparatus of claim 7 wherein the indirect determining means includes
   means for determining the torque rate in the first area;
   means for calculating a first stress value in the fastener at a predetermined angle of advance using the first torque rate;
   means for determining the torque rate in the second area;
   means for calculating a second stress value in the fastener at the predetermined angle of advance using the second torque rate; and
   means for comparing the first and second stress values.

9. Apparatus for tightening a threaded fastener at least partially into a region of increasing fastener stress where the torque curve exhibited by the fastener is expected to be linear, comprising
   means for applying torque to the threaded fastener;
   means for finally terminating tightening of the fastener in the region of fastener stress in response to a final shutoff parameter other than the curvature of the torque curve; and
   means operative after the termination of tightening for monitoring the fastener including
       means for checking the curvature of the torque curve.

* * * * *

UNITED STATES PATENT AND TRADEMARK OFFICE
CERTIFICATE OF CORRECTION

PATENT NO. : 4,280,380
DATED : July 28, 1981
INVENTOR(S) : Siavash Eshghy

It is certified that error appears in the above—identified patent and that said Letters Patent is hereby corrected as shown below:

Column 19, line 18, delete "o tain" and insert --obtain--.

Column 37, line 36, delete ">" and insert --$\leq$--.

Column 39, equation 93, delete "$T_D$", first occurrence, and insert --$T_D'$--; in equation 94, in the denominator, delete "$T_D$" and insert --$T_D'$--.

Column 41, line 65, delete "lost" and insert --lose--.

Column 44, line 9, delete "point" and insert --pointed--.

Column 45, line 14, delete "inpts" and insert --inputs--; line 25, delete "gats" and insert --gates--; and line 64, delete "circit" and insert --circuit--.

Signed and Sealed this

*Fourteenth* Day of *September 1982*

[SEAL]

*Attest:*

*Attesting Officer*

GERALD J. MOSSINGHOFF

*Commissioner of Patents and Trademarks*

UNITED STATES PATENT AND TRADEMARK OFFICE
CERTIFICATE OF CORRECTION

PATENT NO. : 4,280,380
DATED : July 28, 1981
INVENTOR(S) : Siavash Eshghy

It is certified that error appears in the above—identified patent and that said Letters Patent is hereby corrected as shown below:

Column 19, line 18, delete "o tain" and insert --obtain--.

Column 37, line 36, delete ">" and insert --$\leq$--.

Column 39, equation 93, delete "$T_D$", first occurrence, and insert --$T_D'$--; in equation 94, in the denominator, delete "$T_D$" and insert --$T_D'$--.

Column 41, line 65, delete "lost" and insert --lose--.

Column 44, line 9, delete "point" and insert --pointed--.

Column 45, line 14, delete "inpts" and insert --inputs--; line 25, delete "gats" and insert --gates--; and line 64, delete "circit" and insert --circuit--.

Signed and Sealed this

Fourteenth Day of September 1982

[SEAL]

Attest:

GERALD J. MOSSINGHOFF

Attesting Officer  Commissioner of Patents and Trademarks